(12) United States Patent
Kimura et al.

(10) Patent No.: US 10,088,813 B2
(45) Date of Patent: Oct. 2, 2018

(54) CONTROL APPARATUS AND CONTROL METHOD

(71) Applicant: Mitsubishi Electric Corporation, Chiyoda-ku (JP)

(72) Inventors: Masaya Kimura, Tokyo (JP); Hidetoshi Ikeda, Tokyo (JP); Fumio Kometani, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 42 days.

(21) Appl. No.: 15/508,684

(22) PCT Filed: Aug. 17, 2015

(86) PCT No.: PCT/JP2015/073055
§ 371 (c)(1),
(2) Date: Mar. 3, 2017

(87) PCT Pub. No.: WO2016/056305
PCT Pub. Date: Apr. 14, 2016

(65) Prior Publication Data
US 2017/0277143 A1  Sep. 28, 2017

(30) Foreign Application Priority Data
Oct. 9, 2014 (JP) .................. 2014-208146

(51) Int. Cl.
*G05B 13/02* (2006.01)
(52) U.S. Cl.
CPC ........... *G05B 13/0245* (2013.01); *G05B 2219/39241* (2013.01)
(58) Field of Classification Search
CPC .......... G05B 13/0245; G05B 2219/39241
See application file for complete search history.

(56) References Cited

U.S. PATENT DOCUMENTS

| 4,466,054 A * | 8/1984 | Shigemasa ......... G05B 13/0245 318/561 |
| 5,875,109 A * | 2/1999 | Federspiel ........... G05B 13/024 700/40 |
| 2007/0150079 A1* | 6/2007 | Blevins .............. G05B 23/0251 700/41 |

FOREIGN PATENT DOCUMENTS

| JP | 61-279901 A | 12/1986 |
| JP | 2-213903 A | 8/1990 |

(Continued)

OTHER PUBLICATIONS

Nobuhide Suda, "PID control," System Control Information Library, Asakura Publishing Co., Ltd., 1$^{st}$ edition, Mar. 1, 1997, (18 pages) (with English translation).

(Continued)

*Primary Examiner* — Ryan A Jarrett
(74) *Attorney, Agent, or Firm* — Oblon, McClelland, Maier & Neustadt, L.L.P.

(57) ABSTRACT

A control apparatus includes: a control computing unit that generates an operation amount based on a control deviation, calculated by performing subtraction of a command value and a control amount, and a control gain; an adjustment-execution-command generating unit that generates an adjustment-execution command value indicating ON or OFF; a binary output unit that generates an adjustment-time addition value based on the control deviation and a hysteresis-width setting value; a standard-deviation estimating unit that calculates a low-frequency-component removed signal obtained by removing low-frequency components of the control amount or the control deviation and calculates a standard-deviation estimated value, which is an estimated value of a standard deviation; and a hysteresis-width computing unit that calculates a hysteresis-width computed value based on the standard-deviation estimated value and (Continued)

changes the hysteresis-width setting value of the binary output unit to the hysteresis-width computed value.

7 Claims, 12 Drawing Sheets

(56) References Cited

FOREIGN PATENT DOCUMENTS

| | | |
|---|---|---|
| JP | 2007-193664 A | 8/2007 |
| JP | 2013-235307 A | 11/2013 |

OTHER PUBLICATIONS

International Search Report dated Sep. 8, 2015 in PCT/JP2015/073055 filed Aug. 17, 2015.
Office Action dated Nov. 7, 2017 in Japanese Patent Application No. 2016-552857 (with unedited computer generated English translation).

* cited by examiner

CONTROL APPARATUS AND CONTROL METHOD

FIELD

The present invention relates to a control apparatus and a control method for performing control of a target apparatus according to feedback control.

BACKGROUND

In an industrial apparatus, feedback control is used to realize necessary operation. In the feedback control, adjustment of a control gain used to calculate an operation amount from a detected control amount is necessary.

As one of methods for appropriately adjusting the control gain, there is a limit cycle method. The limit cycle method is a method of, by performing control for selecting one from two operation amounts and outputting the operation amount called binary control, vibrating a control amount at a constant cycle or a cycle regarded as constant, identifying dynamic characteristics of a control target on the basis of a vibration waveform, and calculating a control gain (Non Patent Literature 1). The vibration waveform is called limit cycle waveform.

In the limit cycle method, to identify the dynamic characteristics of the control target, it is necessary to select one of the operation amounts of the binary control on the basis of a plus or minus sign of a control deviation, vibrate the control amount at the constant cycle or the cycle regarded as constant, and generate the limit cycle waveform. However, in the limit cycle method, when noise is included in the detected control amount and the plus or minus sign of the control deviation is reversed because of the influence of the noise, on/off control operates irrespective of the dynamic characteristics of the control target. In some case, chattering occurs, the limit cycle waveform of the constant cycle or the cycle regarded as constant cannot be obtained, and the dynamic characteristics of the control target cannot be identified.

Patent Literature 1 mentions that, even when noise is included in the detected control amount, the limit cycle waveform of the constant cycle or the cycle regarded as constant is generated. Patent Literature 1 mentions that the chattering of the binary control due to the influence of the noise included in the detected control amount is prevented by providing a hysteresis characteristic in the determination of the plus or minus sign of the control deviation. Patent Literature 1 mentions that the dynamic characteristics of the control target is identified and the control gain is calculated even when noise is included in the detected control amount.

CITATION LIST

Patent Literature

Patent Literature 1: Japanese Patent Application Laid-Open No. S61-279901

Non Patent Literature

Non Patent Literature 1: Nobuhide Suda, "PID control", System Control Information Library, Asakura Publishing Co., Ltd., pp 162 to 167

SUMMARY

Technical Problem

However, in the technology disclosed in Patent Literature 1, unless the magnitude of hysteresis of the hysteresis characteristic provided in the determination of the plus or minus sign of the control deviation is appropriately set, an accurate limit cycle waveform cannot be obtained. It is difficult to accurately perform the calculation of the control gain.

When the magnitude of set hysteresis is small and inappropriate, the influence of the noise included in the detected control amount cannot be eliminated. The chattering occurs because the binary control operates irrespective of the dynamic characteristics of the control target. The limit cycle waveform of the constant cycle or the cycle regarded as constant cannot be obtained. The calculation of the control gain cannot be accurately performed.

When the magnitude of the set hysteresis is too large and inappropriate, even if the influence of the noise can be eliminated, it is likely that the vibration amplitude of the control amount increase, the control amount is saturated and the limit cycle waveform changes to a shape unrelated to the dynamic characteristics of the control target, and the control target is damaged. The calculation of the control gain cannot be accurately performed.

Therefore, when the limit cycle method is carried out on the basis of Patent Literature 1, an operator needs to observe beforehand the magnitude of the noise included in the detected control amount and set the magnitude of the hysteresis to a degree capable of eliminating the influence of the noise and not excessively increasing the vibration amplitude of the control amount. Therefore, Patent Literature 1 has a problem in that considerable labor and time are required to set appropriate magnitude of the hysteresis.

In the case of a configuration in which the user sets the magnitude of the hysteresis, it is necessary to provide, in a control apparatus, a function for displaying a control amount such that the operator can observe the control amount in detail from the outside and a function for setting the magnitude of the hysteresis from the outside. Therefore, there is also a problem in that Patent Literature 1 increases production cost of the control apparatus.

Further, in a specific operation environment, even if the magnitude of the hysteresis is appropriately set by the operator, the magnitude of the noise included in the control amount increases according to a change in the magnitude of the control amount, and the magnitude of the noise included in the control amount increases according to an operation state of an electric machine or an electronic apparatus set around the control apparatus and the control target. In some case, the influence of the noise cannot be eliminated and the calculation of the control gain cannot be accurately performed. In such a case, the operator needs to change the magnitude of the hysteresis on the basis of the magnitude of the control amount or on the basis of the operation state of the electric machine or the electronic apparatus set around the control apparatus and the control target. The operator also needs to check the magnitude of the noise included in the control amount. Therefore, Patent Literature 1 also has a problem in that the operator needs to continue to change the setting of the magnitude of the hysteresis and considerable time and labor are required.

The present invention has been devised in view of the above and an object of the present invention is to provide a control apparatus and a control method that can eliminate the influence of noise and accurately calculate a control gain by appropriately setting the magnitude of hysteresis.

Solution to Problem

In order to solve the aforementioned problem and achieve the object, the present invention provides a control apparatus including: a subtracter that calculates a control deviation on the basis of a command value input from an outside and a control amount input from a control target apparatus; a control computing unit that generates an operation amount on the basis of the control deviation and a control gain and outputs the operation amount; an adjustment-execution-command generating unit that generates an adjustment-execution command value indicating ON or OFF and outputs the adjustment-execution command value; a binary output unit that generates, in a period in which the adjustment-execution command value output from the adjustment-execution-command generating unit is ON, an adjustment-time addition value on the basis of the control deviation and a hysteresis-width setting value and outputs the adjustment-time addition value; a standard-deviation estimating unit that calculates, in a period in which the adjustment-execution command value output from the adjustment-execution-command generating unit is OFF, a low-frequency-component removed signal obtained by removing low-frequency components of the control amount or the control deviation and calculates a standard-deviation estimated value, which is an estimated value of a standard deviation of the low-frequency component removed signal; and a hysteresis-width computing unit that calculates a hysteresis-width computed value on the basis of the standard-deviation estimated value and changes the hysteresis-width setting value of the binary output unit to the hysteresis-width computed value.

Advantageous Effects of Invention

According to the present invention, there is an effect that the influence of noise is eliminated and a control gain is accurately calculated by appropriately setting the magnitude of hysteresis.

DESCRIPTION OF EMBODIMENTS

Control apparatuses according to embodiments of the present invention are explained in detail below with reference to the drawings. Note that the present invention is not limited by the embodiments.

First Embodiment

Figure 1:
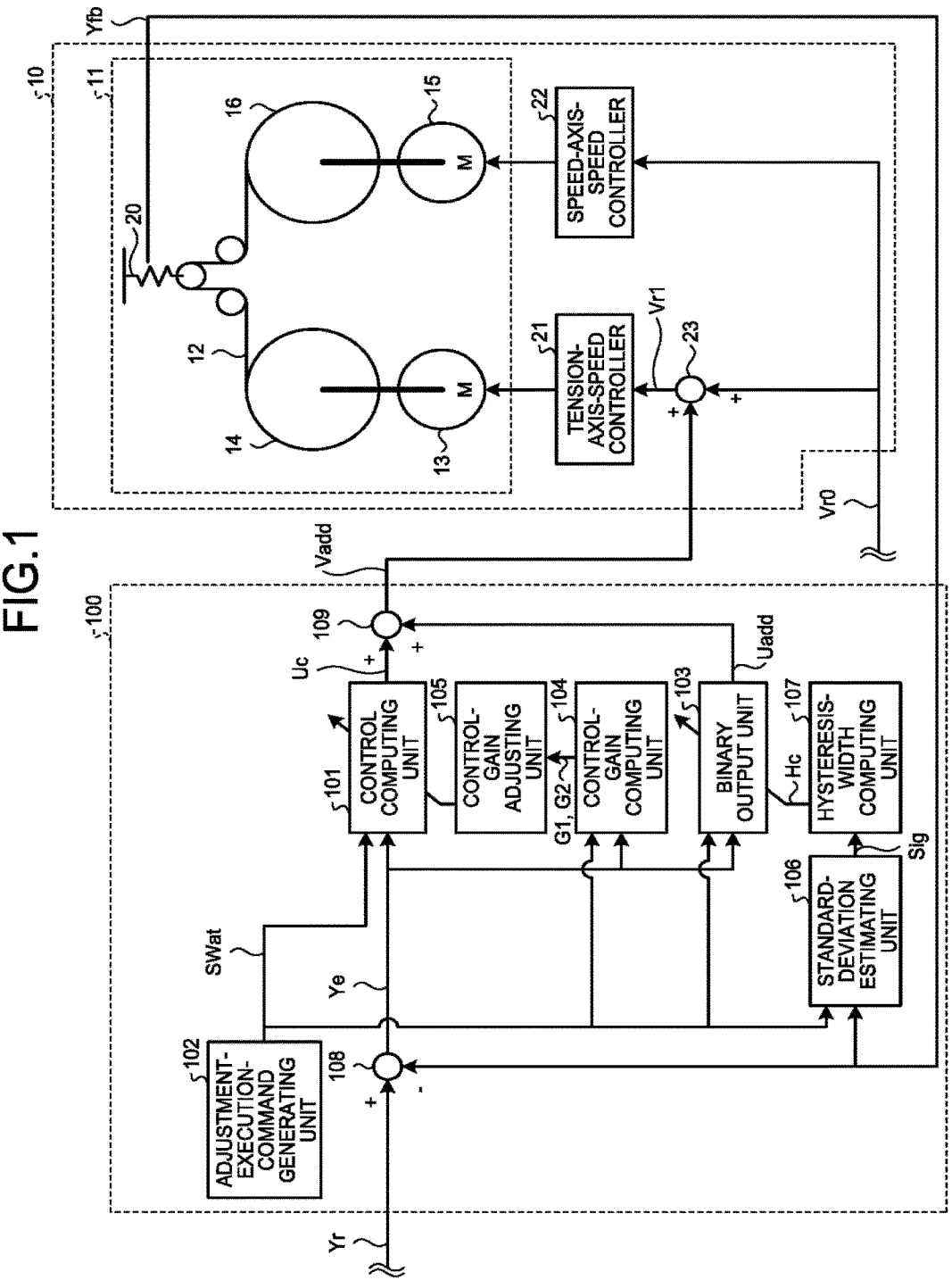
FIG. 1 is a configuration diagram of a control apparatus and a control target apparatus according to a first embodiment.
Figure 2:
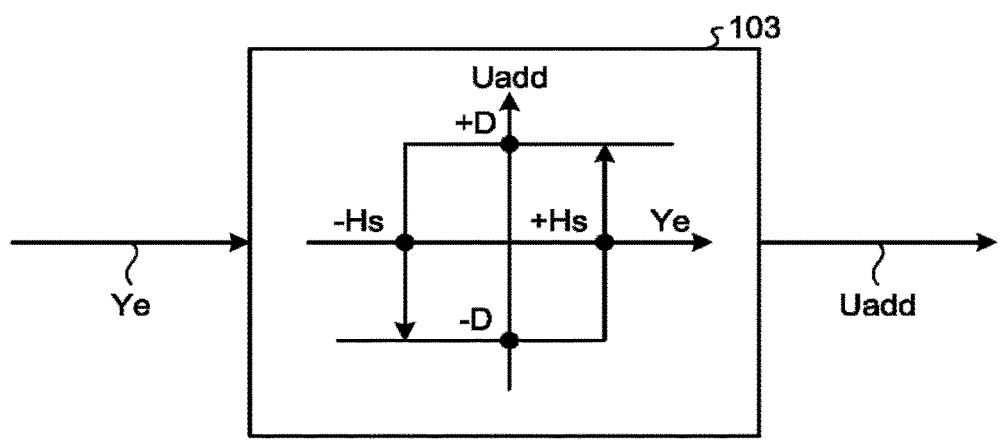
FIG. 2 is a diagram schematically showing the operation of a binary output unit according to the embodiment.
Figure 3:
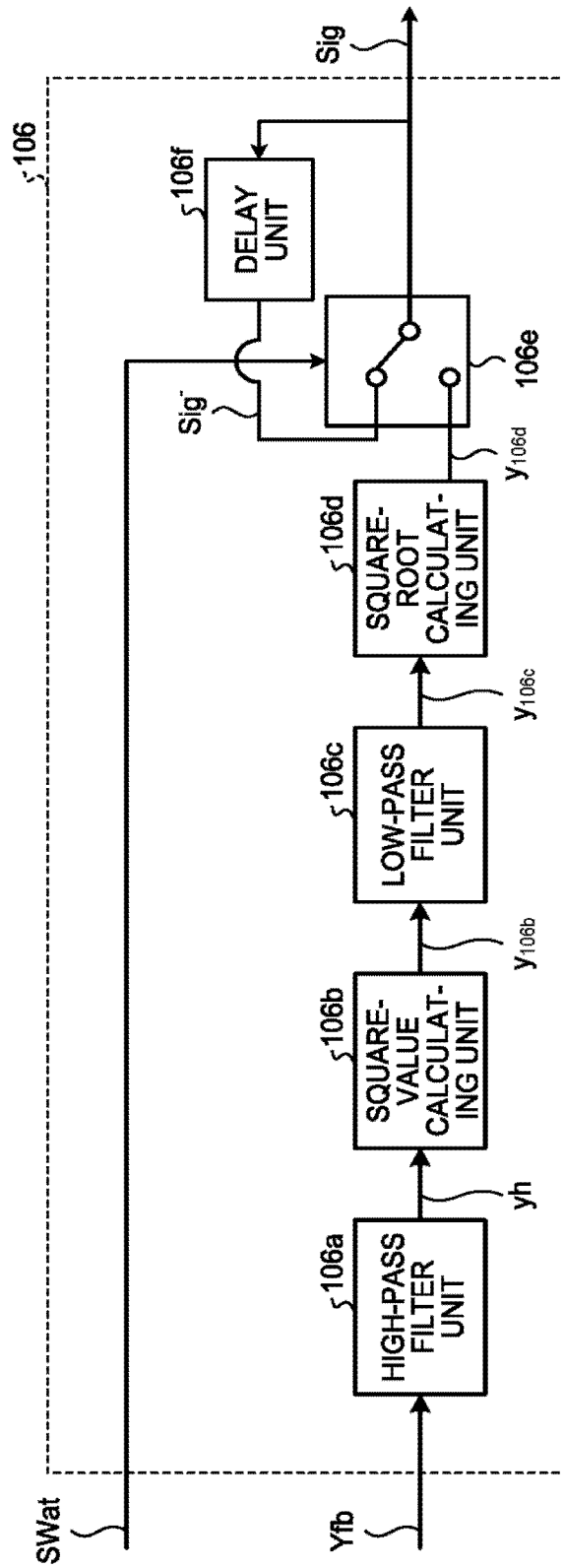
FIG. 3 is a configuration diagram of a standard-deviation estimating unit according to the first embodiment.

FIG. 1 is a configuration diagram of a control apparatus 100 and a control target apparatus 10 according to a first embodiment. FIG. 2 is a diagram schematically showing the operation of a binary output unit 103 according to the first embodiment. FIG. 3 is a configuration diagram of a standard-deviation estimating unit 106 according to the first embodiment.

As shown in FIG. 1, the control target apparatus 10 includes an inter-roll conveying mechanism 11 that conveys and winds a conveyed material 12, a tension-axis-speed controller 21 that controls rotating speed of tension axis motor 13, a speed-axis-speed controller 22 that controls rotating speed of a speed axis motor 15, and an adder 23 that performs addition. A tension-axis-speed addition value Vadd is input to the control target apparatus 10 from the control apparatus 100. A reference-speed command value Vr0 is input to the control target apparatus 10 from the outside.

The inter-roll conveying mechanism 11 includes a mechanism for conveying a belt-lie or linear conveyed material 12 among a plurality of rolls. As the conveyed material 12, paper, resin, metal, or fiber is illustrated. The inter-roll conveying mechanism 11 includes the tension axis motor 13 including a driving mechanism, a tension axis roll 14 including a rotating mechanism, a speed axis motor 15 including a driving mechanism, a speed axis roll 16 including a rotating mechanism, and a tension detector that calculates a tension detection value Yfb.

The inter-roll conveying mechanism 11 drives the tension axis motor 13 and the speed axis motor 15 to rotate the tension axis roll 14 and the speed axis roll 16 to wind the conveyed material 12.

It is assumed that a slip between the tension axis roll 14 and the conveyed material 12 is very small. It is assumed that circumferential speed of the tension axis roll 14 and speed of a portion of the conveyed material 12 in contact with the tension axis roll 14 coincide with each other or fit within a predetermined range. It is assumed that a slip between the speed axis roll 16 and the conveyed material 12 is very small. Circumferential speed of the speed axis roll 16 and speed of a portion of the conveyed material 12 in contact with the speed axis roll 16 coincide with each other or fit within a predetermined range.

The tension-axis-speed controller 21 controls rotating speed of the tension axis motor 13 such that speed of conveyance of the conveyed material 12 by the tension axis roll 14 coincides with an input tension-axis-speed command value Vr1. Specifically, the tension-axis-speed controller 21 controls, taking into account the diameter or a speed reduction ratio of the tension axis roll 14, the rotating speed of the tension axis motor 13 to coincide with or fit within a predetermined range with respect to a command value obtained by converting the tension-axis-speed command value Vr1 into the rotating speed of the tension axis motor 13.

The speed-axis-speed controller 22 controls the rotating speed of the speed axis motor 15 such that speed of conveyance of the conveyed material 12 by the speed axis roll 16 coincides with or fits within a predetermined range with respect to the input reference-speed command value Vr0. Specifically, the speed-axis-speed controller 22 controls, taking into account the diameter and a speed reduction ratio of the speed axis roll 16, the rotating speed of the speed axis motor 15 to coincide with or fit within a predetermined range with respect to a command value obtained by converting the reference-speed command value Vr0 into the rotating speed of the speed axis motor 15.

The reference-speed command value Vr0 input from the outside specifies conveying speed of the conveyed material 12 and can take various values according to conveyance conditions of the conveyed material 12.

The adder 23 adds up the reference-speed command value Vr0 and the tension-axis-speed addition value Vadd to calculate the tension-axis-speed command value Vr1 and outputs the tension-axis-speed command value Vr1.

The tension detector 20 outputs the tension detection value Yfb, which is a value obtained by detecting the tension of the conveyed material 12. The tension detection value Yfb is a control value and is a variable controlled to approach a command value as explained below.

In the first embodiment, the to axis roll 14 is explained as a configuration for winding the conveyed material 12 and the speed axis roll 16 is explained as a configuration for unwinding the conveyed material 12. However, the present invention is not limited to these configurations. The speed axis roll 16 can be configured to wind the conveyed material 12 and the tension axis roll 14 can be configured to unwind the conveyed material 12. The tension axis roll 14 and the speed axis roll 16 can be intermediate shafts that do not directly perform the winding and the unwinding of the conveyed material 12 and perform only feeding operation of the conveyed material 12.

The control target apparatus 10 adds up the reference-speed command value Vr0 and the tension-axis-speed addition value Vadd and generates the tension-axis-speed command value Vr1 of the tension axis roll 14. Therefore, the tension axis roll 14 rotates faster by the tension-axis-speed addition value Vadd compared with the speed axis roll 16. That is, conveying speed of the portion of the conveyed material 12 in contact with the tension axis roll 14 is higher than conveying speed of the portion of the conveyed material 12 in contact with the speed axis roll 16. The conveyed material 12 is pulled between the tension axis roll 14 and the speed axis roll 16, whereby tension is generated. In the control target apparatus 10, when a value of the tension-axis-speed addition value Vadd is changed, because the rotating speed of the tension axis roll 14 is changed, the tension generated in the conveyed material 12 changes.

The inter-roll conveying mechanism 11 measures, with the tension detector 20, tension acting on the conveyed material 12 and outputs the tension detection value Yfb. That is, the control target apparatus 10 is configured to perform feedback control by being combined with the control apparatus 100 that calculates the tension-axis-speed addition value Vadd using a value of the tension detection value Yfb.

The control apparatus 100 includes a control computing unit 101 that calculates an operation amount Uc, an adjustment-execution-command generating unit 102 that generates an adjustment-execution command value SWat, which is a command value indicating possibility of execution of adjustment, a binary output unit 103 that calculates an adjustment-time addition value Uadd, which is a value added to the operation amount Uc during the adjustment, and a control-gain computing unit 104 that calculates a gain candidate value. The control apparatus 100 includes a control-gain adjusting unit 105 that changes a value of a gain used in the control computing unit 101, a standard-deviation estimating unit 106 that calculates a standard-deviation estimated value Sig, which is an estimated value of a standard deviation, a hysteresis-width computing unit 107 that calculates a hysteresis-width computed value Hc, a subtracter 108 that performs subtraction, and an adder 109 that performs addition. A tension command value Yr is input to the control apparatus 100 from the outside. The tension detection value Yfb is input to the control apparatus 100 from the control target apparatus 10. The control apparatus 100 outputs the tension-axis-speed addition value Vadd to the control target apparatus 10.

A tension deviation value Ye, which is a deviation between the tension command value Yr and the tension detection value Yfb, and an adjustment-execution command value SWat are input to the control computing unit 101. The tension deviation value Ye means a control deviation. In a normal state in which the adjustment-execution command value SWat is off, the control computing unit 101 outputs, as the operation amount Uc, a sum of proportional compensation obtained by multiplying the tension deviation value Ye with a proportional gain, which is one of control gains, and integral compensation obtained by multiplying the tension deviation value Ye with an integral gain, which is one of the control gains, and performing integration. In the first embodiment, a period in which the adjustment-execution command value SWat is on is referred to as automatic adjustment period.

When the adjustment-execution command value SWat is switched from OFF to ON, the control computing unit 101 retains a value of the operation amount Uc immediately before the adjustment-execution command value SWat is switched to ON and outputs the retained value of the operation amount Uc in the automatic adjustment period. Operation for retaining the value of the operation amount Uc immediately before the adjustment-execution command value SWat is switched to ON is realized by setting the proportional gain and the integral gain to 0 and retaining an output of the integration. Consequently, the control computing unit 101 can keep an immediately preceding stable control state even in the automatic adjustment period, stably shift to the automatic adjustment period in which automatic adjustment is executed as explained below, and set the control gain to an accurate value in a short time.

The adjustment-execution-command generating unit 102 generates the adjustment-execution command value SWat, which is a signal indicating ON or OFF on the basis of an instruction input by operation from the outside. The adjustment-execution-command generating unit 102 changes the adjustment-execution command value SWat from OFF to ON according to the operation from the outside, outputs a signal of ON for a predetermined period, and thereafter returns the adjustment-execution command value SWat to OFF. The predetermined period is a predetermined fixed time or a period until it is determined that an output of the binary output unit 103 explained below has changed a predetermined number of times. However, the present invention is not limited to these configurations.

The binary output unit 103 performs adjustment operation in the automatic adjustment period in which the adjustment-execution command value SWat is ON and outputs, using the tension deviation value Ye and a hysteresis-width setting value Hs, the adjustment-time addition value Uadd, which is a value having amplitude of the magnitude of a predetermined addition value amplitude D, plus and minus of the value being determined by a method explained below. Note that, as explained below, the binary output unit 103 outputs the adjustment-time addition value Uadd of 0 in a period in which the adjustment-execution command value SWat is OFF.

FIG. 2 is a diagram schematically showing the operation of the binary output unit 103 that selects one of +D and −D on the basis of the tension deviation value Ye and the hysteresis-width setting value Hs and outputs the adjustment-time addition value Uadd.

A method of determining plus and minus of the adjustment-time addition value Uadd is explained. When the magnitude of the tension deviation value Ye is larger than the hysteresis-width setting value Hs, the binary output unit 103 selects one of two values of +D and −D on the basis of a sign of the tension deviation value Ye. When the magnitude of the tension deviation value Ye is equal to or smaller than the hysteresis-width setting value Hs, the binary output unit 103 selects +D if the last adjustment-time addition value add is +D and selects −D if the last adjustment-time addition value Uadd is −D. That is, in the determination of the adjustment-time addition value Uadd, the tension deviation value Ye has a hysteresis characteristic of the magnitude of the hysteresis-width setting value Hs.

FIG. 2 schematically shows the operation of the binary output unit 103 when selecting one of the two values +D and −D on the basis of the tension deviation value Ye and the hysteresis-width setting value Hs. When selecting one of +D and −D, the binary output unit 103 can select, using a signal obtained by causing a low-pass filter to act on the tension deviation value Ye instead of the tension deviation value Ye, one of the two values +D and −D on the basis of the signal obtained by causing the low-pass filter to act on the tension deviation value Ye and the hysteresis-width setting value Hs.

The operation of the binary output unit 103 is the same as a method called limit cycle method used in temperature adjustment control. When the adjustment-execution command value SWat is switched to ON, the adjustment-time addition value Uadd output by the binary output unit 103 and the tension deviation value Ye oscillate.

The tension deviation value Ye and the adjustment-execution command value SWat are input to the control-gain computing unit 104. In the automatic adjustment period in which the adjustment-execution command value SWat is ON, the control-gain computing unit 104 measures the vibration cycle and the amplitude of the tension deviation value Ye and calculates, on the basis of a result of the measurement, a proportional-gain candidate value G1, which is a candidate of the proportional gain of the control computing unit 101 and an integral-gain candidate value G2, which is a candidate of the integral gain. Note that the proportional gain candidate value G1 and the integral-gain candidate value G2 are collectively referred to as control gain candidate value.

Specifically, the control-gain computing unit 104 sets, as a corrected amplitude Ya, a value obtained by subtracting the hysteresis-width setting value Hs from the amplitude of the tension deviation value Ye and multiplies the inverse of the corrected amplitude Ya with a predetermined constant to calculate the proportional-gain control value G1. The control-gain computing unit 104 multiplies a vibration cycle of an integral time constant of proportional integral computation with a ratio of amplitudes of the corrected amplitude Ya and the tension deviation value Ye and a predetermined constant to calculate the integral-gain candidate value G2.

As a specific calculation method for the proportional gain and the integral gain, a method of calculating a linearized gain of input and output of the binary output unit 103 on the basis of a describing function method and determining the proportional gain and the integral gain on the basis of a limit sensitivity method of Ziegler-Nichols only has to be used. According to this method, the control-gain computing unit 104 is capable of performing accurate adjustment based on characteristics of the conveyed material 12 and characteristics of the tension detector 20.

The control-gain computing unit 104 outputs the calculated proportional-gain candidate value G1 and the calculated integral-gain candidate value G2 at a point in time when the adjustment-execution command value SWat is switched to OFF.

The proportional-gain candidate value G1 and the integral-gain candidate value G2 calculated by the control-gain computing unit 104 are input to the control-gain adjusting unit 105. The control-gain adjusting unit 105 changes the proportional gain and the integral gain of the control computing unit 101 to the calculated proportional-gain candidate value G1 and the calculated integral-gain candidate value G2.

In the first embodiment, the control-gain adjusting unit 105 changes the proportional gain and the integral gain of the control computing unit 101 to the proportional-gain candidate value G1 and the integral-gain candidate value G2 immediately after the proportional-gain candidate value G1 and the integral-gain candidate value G2 are input. However, the present invention is not limited to these configurations. The control-gain adjusting unit 105 can execute changing operation for the proportional gain and the integral gain of the control computing unit 101 after the operator of the control apparatus 100 checks the proportional-gain candidate value G1 and the integral-gain candidate value G2. The control-gain adjusting unit 105 can retain a plurality of sets of the proportional-gain candidate values G1 and the integral-gain candidate values G2 and, after the operator of the control apparatus 100 selects one set of the proportional gain candidate value G1 and the integral-gain candidate value G2 out of the sets, execute changing processing for the proportional gain and the integral gain of the control computing unit 101.

FIG. 3 is a specific configuration diagram of the standard-deviation estimating unit 106. The standard-deviation estimating unit 106 includes a high-pass filter unit 106a that calculates a low-frequency-component removed signal yh obtained by removing low-frequency components of the tension detection value Yfb, a square-value calculating unit 106b that calculates an output signal $y_{106b}$, which is a square value of the input signal yh, and a low-pass filter unit 106c that causes a low-pass filter to act and calculates an output signal $y_{106c}$. The standard-deviation estimating unit 106 includes a square-root calculating unit 106d that calculates an output signal $y_{106d}$, which is a square root of the input signal $y_{106c}$, a selector unit 106e that outputs the standard-deviation estimated value Sig on the basis of the adjustment-execution command value SWat, and a delay unit 106f that retains the standard-deviation estimated value Sig.

The adjustment-execution command value SWat and the tension detection value Yfb are input to the standard-deviation estimating unit 106. In a period in which the adjustment-execution command value SWat is OFF, the standard-deviation estimating unit 106 calculates the standard-deviation estimated value Sig on the basis of the tension detection value Yfb according to a method explained below and outputs the standard-deviation estimated value Sig.

In the automatic adjustment period in which the adjustment-execution command value SWat is ON, the standard-deviation estimating unit 106 operates such that a last standard-deviation estimated value Sig−, which is a standard-deviation estimated value in the immediately preceding cycle explained below, is output. Therefore, the standard-deviation estimated value Sig output from the standard-deviation estimating unit 106 in the automatic adjustment period changes to the last standard-deviation estimated value Sig−.

The tension detection value Yfb is input to the high-pass filter unit 106a. The high-pass filter unit 106a causes the high-pass filter to act on the tension detection value Yfb, calculates a low-frequency-component removed signal yh obtained by removing low-frequency components of the tension detection value Yfb, and outputs the low-frequency-component removed signal yh.

The low-frequency-component removed signal yh is input to the square-value calculating unit 106b. The square-value calculating unit 106b calculates the output signal $y_{106b}$ obtained by raising a value of the low-frequency-component removed signal yh to the second power and outputs the output signal $y_{106b}$.

The output signal $y_{106b}$ is input to the low-pass filter unit 106c. The low-pass filter unit 106c causes the low-pass filter to act on the output signal $y_{106b}$, calculates the output signal $y_{106c}$ obtained by removing high-frequency components of the output signal $y_{106b}$, and outputs the output signal $y_{106c}$.

The output signal $y_{106c}$ is input to the square-root calculating unit 106d. The square-root calculating unit 106d calculates the output signal $y_{106d}$ obtained by calculating a square root of the output signal $y_{106c}$ and outputs the output signal $y_{106d}$.

The last standard-deviation estimated value Sig− and the output signal $y_{106d}$ are input to the selector unit 106e. The selector unit 106e selects the last standard-deviation estimated value Sig− when the adjustment-execution command value SWat is ON or selects the output signal $y_{106d}$ when the adjustment-execution command value SWat is OFF on the basis of the adjustment-execution command value SWat, changes the selected output signal to the standard-deviation estimated value Sig, and outputs the standard-deviation estimated value Sig.

The delay unit 106f retains the standard-deviation estimated value Sig for a period of one cycle of an operation cycle of the standard-deviation estimating unit 106, changes the retained value to the last standard-deviation estimated value Sig−, and outputs the last standard-deviation estimated value Sig− after one cycle of the operation cycle of the standard-deviation estimating unit 106.

Referring back to FIG. 1, the standard-deviation estimated value Sig is input to the hysteresis-width computing unit 107. The hysteresis-width computing unit 107 calculates the hysteresis-width computed value Hc on the basis of the standard-deviation estimated value Sig. Specifically, the hysteresis-width computing unit 107 calculates the hysteresis-width computed value Hc by multiplying the standard-deviation estimated value Sig with a predetermined coefficient Kh. The coefficient Kh is a constant and is set to a value equal to or larger than 1 and equal to or smaller than 60.

The hysteresis-width computing unit 107 changes the hysteresis-width setting value Hs of the binary output unit 103 to the hysteresis-width computed value Hc at every operation cycle.

The tension command value Yr and the tension detection value Yfb are input to the subtracter 108. The subtracter 108 calculates the tension deviation value Ye from a difference between the tension command value Yr and the tension detection value Yfb, and outputs the tension deviation value Ye.

The operation amount Uc and the adjustment-time addition value Uadd are input to the adder 109. The adder 109 adds up the operation amount Uc and the adjustment-time addition value Uadd to calculate the tension-axis speed addition value Vadd and outputs the tension-axis speed addition value Vadd.

The operation of the control apparatus 100 is explained. In a period in which the adjustment-execution command value SWat output from the adjustment-execution-command generating unit 102 is OFF, the control computing unit 101 calculates the operation amount Uc to set the tension deviation value Ye to 0. The adjustment-time addition value Uadd, which is an output of the binary output unit 103 is 0. A value of the tension-axis speed addition value Vadd coincides with a value of the operation amount Uc. That is, operation for outputting the tension-axis speed addition value Vadd by the control apparatus 100 is operation of feedback control by the PI control.

In the period in which the adjustment-execution command value SWat is OFF, the standard-deviation estimating unit 106 outputs the standard-deviation estimated value Sig, which is an estimated value of a standard deviation of the low-frequency components removed signal yh obtained by removing low-frequency components of the tension detection value Yfb. The hysteresis-width computing unit 107 calculates the hysteresis-width computed value Hc on the basis of the standard-deviation estimated value Sig calculated by the standard-deviation estimating unit 106 and changes the hysteresis-width setting value As of the binary output unit 103 to the hysteresis-width computed value Hc.

Operation at a point in time when the adjustment-execution-command generating unit 102 changes an output of the adjustment-execution command value SWat from OFF to ON is explained. When the adjustment-execution command value SWat is changed from OFF to ON, the control computing unit 101 retains an output of integration and outputs the fixed operation amount Uc. The standard-deviation estimating unit 106 is switched to operation for substituting the last standard-deviation estimated value Sig− in the standard-deviation estimated value Sig and operates such that the last standard-deviation estimated value Sig− is output. Therefore, when the adjustment-execution command value SWat is changed from OFF to ON, the standard-deviation estimated value output from the standard-deviation estimating unit 106 changes to the last standard-deviation estimated value Sig−. Therefore, the hysteresis-width computed value Hc calculated by the hysteresis-width computing unit 107 changes to a fixed value. The hysteresis-width setting value Hs of the binary output unit 103 changes to a fixed value. The binary output unit 103 alternately selects a value of +D or −D on the basis of the tension deviation value Ye and the hysteresis-width setting value Hs and outputs the adjustment-time addition value Uadd.

In the selection of the value of +D or −D of the adjustment-time addition value Uadd of the binary output unit 103, when the influence of noise included in the tension detection value Yfb can be appropriately removed in the hysteresis-width setting value Hs, the tension-axis-speed addition value Vadd and the tension deviation value Ye generate limit cycle vibration of a constant cycle or a cycle regarded as constant.

In the period in which the adjustment-execution command value SWat is ON, the control-gain computing unit 104 calculates the proportional-gain candidate value G1 and the integral-gain candidate value G2 on the basis of a vibration amplitude and a vibration cycle of the tension deviation value Ye.

When a predetermined automatic adjustment period elapses after the adjustment-execution command value SWat is changed from OFF to ON, the adjustment-execution-command generating unit 102 changes the adjustment-execution command value SWat from ON to OFF.

At a point in time when the adjustment-execution-command generating unit 102 changes the adjustment-execution command value SWat from ON to OFF, the binary output unit 103 retains a value of the adjustment-time addition value Uadd at 0. The control-gain computing unit 104 outputs the proportional-gain candidate value G1 and the integral-gain candidate value G2 calculated immediately before the adjustment-execution command value at is changed from ON to OFF.

The control-gain adjusting unit changes a value of the proportional gain and a value of the integral gain of the control computing unit 101 to the input proportional-gain candidate value G1 and the input integral-gain candidate value G2. At this point, the standard-deviation estimating unit 106 operates such that the output signal $y_{106d}$ calculated by the square-root calculating unit 106d is output. Therefore, the standard-deviation estimated value Sig output from the standard-deviation estimating unit 106 is the output signal $y_{106d}$. The control computing unit 101 starts calculation of the operation amount Uc on the basis of the proportional gain and the integral gain changed by the control-gain adjusting unit 105.

As explained below, the control apparatus 100 sets the hysteresis-width setting value Hs of the binary output unit 103 to an appropriate value and determines the adjustment-time addition value Uadd on the basis of the tension deviation value Ye and the hysteresis-width setting value Hs. Therefore, the influence of noise included in the tension detection value Yfb is reduced. As a result, the control apparatus 100 can generate a limit cycle of a constant cycle or a cycle regarded as constant and accurately adjust a control gain.

The control apparatus 100 substitutes the calculated hysteresis-width computed value Hc in the hysteresis-width setting value Hs. At this point, the hysteresis-width computed value Hc is calculated on the basis of the standard-deviation estimated value Sig. The standard-deviation estimated value Sig is estimated as a satisfactory estimated value of a standard deviation of signals of noise included in the tension detection value Yfb by the standard-deviation estimating unit 106 explained below. That is, the control apparatus 100 estimates a value of the standard deviation of the signals of the noise included in the tension detection value Yfb on the basis of the standard-deviation estimated value Sig. Therefore, it is possible to estimate a distribution of the signals of noise that occurs in the automatic adjustment period. It is possible to calculate the hysteresis-width computed value Hc having magnitude of a degree larger than the amplitude of the signals of the noise at a high probability.

The operation and the effect of the standard-deviation estimating unit 106 are explained. In the period in which the adjustment-execution command value SWat is OFF, the high-pass filter unit 106a calculates the low-frequency-component removed signal yh obtained by causing the high-pass filter to act on the tension detection value Yfb.

At this point, if a control gain of the control computing unit 101 is not an appropriate value and a control band is low, the tension detection value Yfb has a vibration component of a low frequency due to the influence of disturbance and an offset error with respect to the tension command value Yr. The vibration component of the low frequency and the offset error occur because the control band is low and control performance is inappropriate and are phenomena not seen during operation of the limit cycle method for vibrating the tension detection value Yfb at a high frequency near a limit frequency. That is, the vibration component of the low frequency and the offset error caused because the control band is low do not affect determination of the adjustment-time addition value Uadd in the limit cycle method. Therefore, it is unnecessary to taken into account the vibration component of the low frequency and the offset error in the calculation of the hysteresis-width computing value Hc. Further, the amplitude of the vibration of the low-frequency components of the tension detection value Yfb is sometimes large compared with the amplitude of the noise. If the standard-deviation estimated value Sig is calculated without distinguishing the vibration of the low-frequency components of the tension detection value Yfb and the signals of the noise, a calculation result of the standard-deviation estimated value Sig is considerably larger than a true value of a standard deviation of the signals of the noise. The hysteresis-width setting value Hs larger more than necessary is set and adversely affects the vibration amplitude of the tension detection value Yfb to be excessively amplified. Therefore, the vibration component of the low-frequency components and the offset error should be removed when the standard-deviation estimated value Sig is calculated.

The high-pass filter unit 106a causes the high-pass filter to act on the tension detection value Yfb. Therefore, it is possible to remove the vibration component of the low frequency and the offset error of the tension detection value Yfb and extracts, with the low-frequency-component removed signal yh, the signals of the noise consisting of the high-frequency components of the tension detection value Yfb.

The configuration and the effect of the standard-deviation estimating unit 106 obtained by including the square-value calculating unit 106b, the low-pass filter unit 106c, and the square-root calculating unit 106d are explained. For the explanation, time series signals x of a certain normal distribution are explained as an example. An average of the time series signals x is represented as $\mu_x$ and a standard deviation of the time series signals x is represented as $\sigma_x$. Because samples are extracted from the time series signals x in time series order, when a time interval of the samples is represented as dt, the following Expression (1) and Expression (2) hold:

[Math. 1]

$$\mu_x = \lim_{N \to \infty} \frac{1}{T} \sum_{k=0}^{N-1} xs(n-k) \times dt \quad (1)$$

[Math. 2]

$$\sigma_x = \sqrt{\lim_{N \to \infty} \frac{1}{T} \sum_{k=0}^{N-1} xs(n-k)^2 \times dt - \mu_x^2} \quad (2)$$

In Expression (1) and Expression (2), xs(i) indicates an i-th sample extracted from the time series signals x and xs(n) indicates a sample at a terminal end time in the time series signals x. In Expression (1) and Expression (2), T=N×dt.

On the other hand, an i-th sample of a signal obtained by causing a first-order lag low-pass filter, which has τ larger than dt as a time constant, to act on the time series signals x is represented as xlpf(i). At this point, xlpf(n) at the terminal end time is calculate by the following Expressions (3).

[Math. 3]

$$xlpf(n) = \frac{dt}{\tau} \times xs(n) + \left(1 - \frac{dt}{\tau}\right) \times xlpf(n-1) \quad (3)$$

The number of samples of the time series signals x used for the calculation of xlpf(p) is represented as N. When N is large, the following Expression (4) holds.

[Math. 4]

$$xlpf(n) = \sum_{k=0}^{N-1} \frac{dt}{\tau} \times \left(1 - \frac{dt}{\tau}\right)^k \times xs(n-k) + \left(1 - \frac{dt}{\tau}\right)^N \times xlpf(n-N) = \quad (4)$$

$$\frac{1}{\tau} \sum_{k=0}^{N-1} xs(n-k) \times dt + o\left(\frac{dt^2}{\tau^2}\right)$$

The expression is approximated making use of the fact that the time constant τ is larger than dt and N is larger than 1. In the expression, $o(dt^2/\tau^2)$ is obtained by putting in order terms having sizes equal to or smaller than the order of $dt^2/\tau^2$ and can be approximated to 0.

When Expression (1) and Expression (4) are compared, when the number N of samples is large and the time constant τ of the low-pass filter is larger than the time interval dt of the samples, xlpf(n) and $\mu_x$ coincide with each other or fit within a predetermined range, it is seen that xlpf(n) is a good estimated value of $\mu_x$.

Similarly, when a result obtained by causing the first-order lag low-pass filter, which has τ as the time constant, to act on a value obtained by raising the sample xs(n) to the second power is represented as x2lpf(n), x2lpf(n) is calculated by the following Expression (5).

[Math. 5]

$$x2lpf(n) = \frac{dt}{\tau} \times xs(n)^2 + \left(1 - \frac{dt}{\tau}\right) \times x2lpf(n-1) = \quad (5)$$

$$\lim_{N \to \infty} \frac{1}{\tau} \sum_{k=0}^{N-1} xs(n-k)^2 \times dt + o\left(\frac{dt^2}{\tau^2}\right)$$

What is represented by A in Expression (6-1) is defined by Expression (6-2) using x2lpf(n) and xlpf(n).

[Math. 6]

$$A = \tilde{\sigma}_x(n) \quad (6-1)$$

[Math. 7]

$$\tilde{\sigma}_x(n) = \sqrt{x2lpf(n) - xlpf(n)^2} \quad (6-2)$$

When Expression (2) and Expression (6-2) are compared, when the number N of samples is large and the time constant τ of the low-pass filter is larger than the time interval dt of the samples, the following fact is found.

That is, because A and $\sigma_x$ coincide with each other or fit within a predetermined range, it is seen that A is a good estimated value of $\sigma_x$. If the average $\mu_x$ of the time series signals x is 0, it is evident that Expression (7) is obtained.

[Math. 8]

$$\tilde{\sigma}_x(n) = \sqrt{x2lpf(n)} \quad (7)$$

The standard-deviation estimating unit 106 calculates an estimated value of a standard deviation of the low-frequency-component removed signal yh according to a method using the low-pass filter as in the example explained above. However, because the low-frequency-component removed signal yh is a signal obtained by removing the low-frequency components of the tension detection value Yfb, an average of the low-frequency-component removed signal yh can be approximated to 0. That is, the estimated value of the standard deviation of the low-frequency-component removed signal yh can be calculated on the basis of Expression (7), which is an operational expression of the estimated value of the standard deviation at the time when the average is 0.

Calculation of Expression (7) is carried out in the square-value calculating unit 106b, the low-pass filter unit 106c, and the square-root calculating unit 106d. Therefore, the output signal $y_{106d}$ of the square-root calculating unit 106d and the standard-deviation estimated value Sig are good estimated values of the standard deviation of the low-frequency-component removed signal yh obtained by extracting the signals of the noise of the tension detection value Yfb. Consequently, the standard-deviation estimating unit 106 can perform estimation of the standard deviation of the signals of the noise included in the tension detection value Yfb.

The operation of the hysteresis-width computing unit 107 is explained. For the explanation, the time series signals x are explained as an example. The average $\mu_x$ of the time series signals x is considered to be 0. Because the time series signals x are the normal distribution, the sample xs extracted at random from the time series signals x is a value satisfying the following Expression (8) at a probability of approximately 68.2689492% and is a value satisfying the following Expression (9) at a probability of approximately 99.9999998%.

[Math. 9]

$$-1 \times \sigma_x \leq xs \leq 1 \times \sigma_x \qquad (8)$$

[Math. 10]

$$-6 \times \sigma_x \leq xs \leq 6 \times \sigma_x \qquad (9)$$

When the value of the standard deviation of the signals of the normal distribution is used in this way, it is possible to calculate upper and lower limits of a range in which samples are included at a high probability. A range including, as upper and lower limits, values calculated by multiplying the standard deviation with a coefficient equal to or larger than 1 and equal to or smaller than 6 is a range in which the sample xs extracted at random is included at a high probability of approximately 68.2689492% to approximately 99.9999996%. Therefore, a value obtained by multiplying the standard deviation with the coefficient equal to or larger than 1 and equal to or smaller than 6 is considered to be a good estimated value of amplitude that the time series signals x can take within a fixed period.

Therefore, a value obtained by multiplying the standard-deviation estimated value Sig, which is the estimated value of the signals of noise included in the tension detection value Yfb, with the coefficient equal to or larger than 1 and equal to or smaller than 6 is considered to be a good estimated value of the amplitude of the signals of the noise within the fixed period.

The hysteresis-width computing unit 107 sets the magnitude of hysteresis to be one time or more and ten times or less as large as the amplitude of the noise included in the tension detection value Yfb. Therefore, it is possible to eliminate the influence of the noise and avoid the magnitude of the hysteresis being set excessively large.

The hysteresis-width computing unit 107 calculates the hysteresis-width computed value Hc by multiplying the standard-deviation estimated value Sig, which is the estimated value of the standard deviation of the signals of the noise included in the tension detection value Yfb, with the coefficient Kh equal to or larger than 1 and equal to or smaller than 60. The coefficient Kh equal to or larger than 1 and equal to or smaller than 60 is intended to set, as the hysteresis computed value Hc, a value obtained by multiplying the standard deviation with a coefficient equal to or larger than 1 and equal to or smaller than 6 and further multiplying the standard deviation with a coefficient equal to or larger than 1 and equal to or smaller than 10. Consequently, the magnitude of the hysteresis-width computed value Hc is calculated to magnitude that can eliminate the influence of the noise and to a degree that does not excessively increase the vibration amplitude of the control amount.

Consequently, the operator does not need to observe the magnitude of the noise included in the detected control amount before calculating the control gain by the limit cycle method. The control apparatus 100 can remove the influence of the noise and can appropriately set the magnitude of the hysteresis not to excessively increase the vibration amplitude of the control amount.

The operator does not need to observe the detected control amount in detail and perform adjustment of the magnitude of the hysteresis from the outside of the control apparatus 100. Therefore, the control apparatus 100 does not need to include a function for displaying the control amount and a function for setting the magnitude of the hysteresis from the outside.

Further, even if there is a change in the magnitude of the noise included in the tension detection value Yfb, the control apparatus 100 sequentially computes appropriate magnitude of the hysteresis with the functions of the standard-deviation estimating unit 106 and the hysteresis-width computing unit 107. Therefore, even if there is a change in the magnitude of the control amount and a change in the magnitude of noise involved in changes of operation states of an electric machine and an electronic apparatus set around the control target apparatus 10, the control apparatus 100 can set a value of the hysteresis having appropriate magnitude.

The control apparatus 100 can set hysteresis having appropriate magnitude and appropriately determines an adjustment-time addition value in the automatic adjustment period. Therefore, it is possible to suppress hunting due to the influence of the noise included in the tension detection value Yfb. As a result, the control apparatus 100 can generate a limit cycle of a constant cycle or a cycle regarded as constant and accurately calculate a value of a control gain.

Note that the high-pass filter unit 106a is explained as causing the high-pass filter to act on the tension detection value Yfb and removing the low-frequency components of the tension detection value Yfb. However, the present invention is not limited to these configurations. When the tension detection value Yfb indicates a fixed value excluding signals of high-frequency components according to the elapse of time, the high-pass filter unit 106a can be configured by a subtracter that calculates a difference between the tension detection value Yfb and the constant as the low-frequency-component removed signal yh. Even in the configuration, it is evident that the high-pass filter unit 106a can calculate the low-frequency-component removed signal yh obtained by removing the low-frequency components of the tension detection value Yfb and the same effect can be obtained. The same holds true in embodiments explained below.

In the first embodiment, the example of the control apparatus 100 in which the low-pass filter is configured by the first-order lag filter is explained. However, the present invention is not limited to these configurations. The control apparatus 100 only has to have a characteristic for removing high-frequency components of an input signal. The same effect can be obtained if a filter having different pole arrangement such as a high-order lag filter in which first-order lag filters are arranged in series, a Butterworth filter, or a Chebyshev filter is used. The same holds true in the embodiments explained below.

The hysteresis-width computing unit 107 is explained as changing the hysteresis-width setting value Hs of the binary output unit 103 to the hysteresis-width computed value Hc at every operation cycle. However, the present invention is not limited to these configurations. The hysteresis-width computing unit 107 can change the hysteresis-width setting value Hs of the binary output unit 103 to the hysteresis-width computed value Hc at every time an integer time as long as an operation cycle. The hysteresis-width computing unit 107 can have a function with which the operator can designate timing for changing the hysteresis-width setting value Hs during the operation of the control apparatus 100.

The hysteresis-width computing unit 107 can change the hysteresis-width setting value Hs to the hysteresis-width computed value Hc at the timing designated by the operator. The same holds true in the embodiments explained below.

In the first embodiment, the control target apparatus 10 is explained as being an apparatus including the inter-roll conveying mechanism. However the control target apparatus 10 is not limited to the apparatus including the inter-roll conveying mechanism. The control target apparatus 10 can be an apparatus having another configuration as long as the apparatus includes a mechanism capable of changing a control amount by receiving an input of an operation amount from the outside and a mechanism for detecting and outputting the control amount and can perform stabilization according to feedback control. The same holds true in the embodiments explained below.

Second Embodiment

Figure 4:
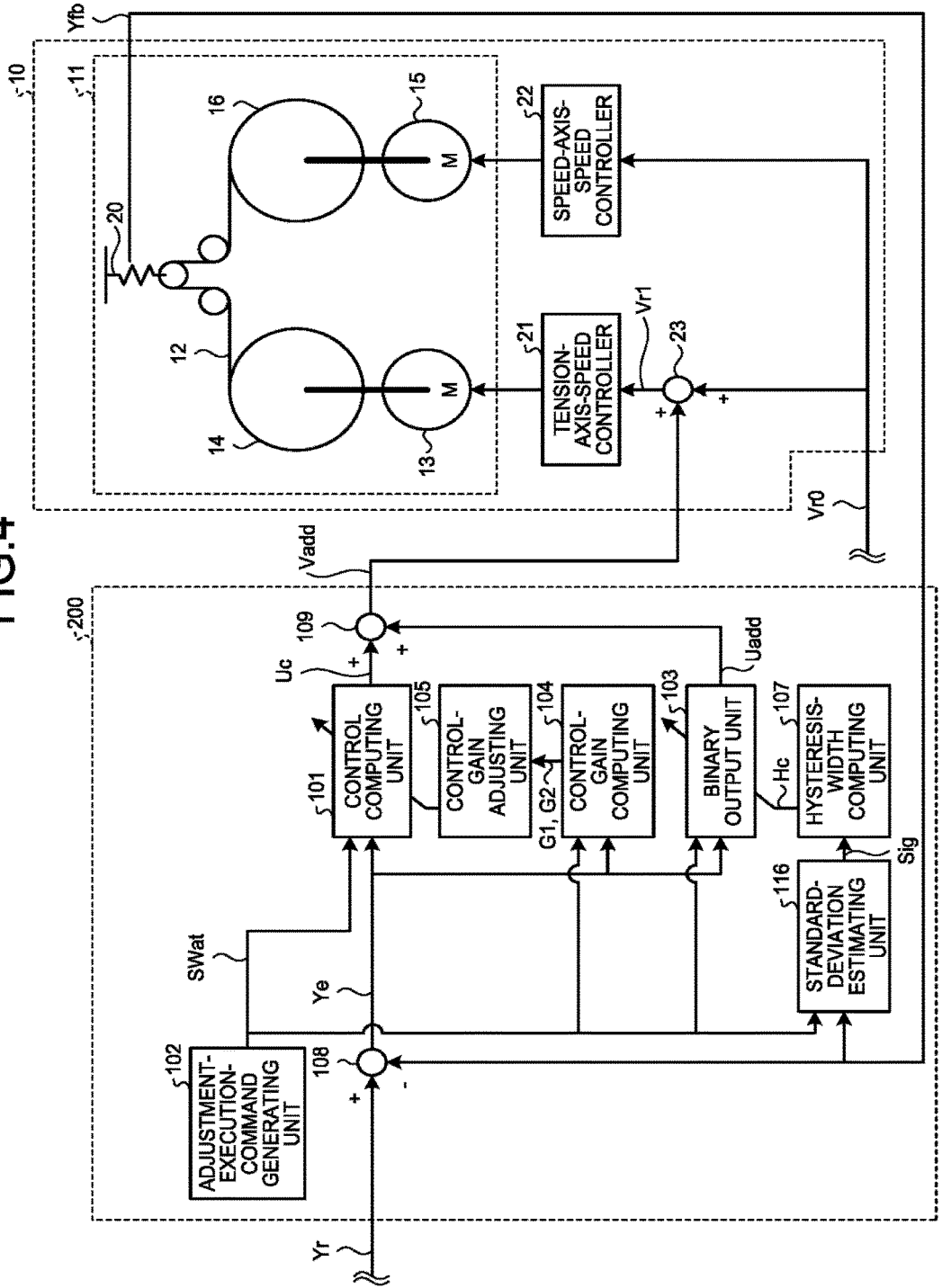
FIG. 4 is a configuration diagram of a control apparatus and a control target apparatus according to a second embodiment.
Figure 5:
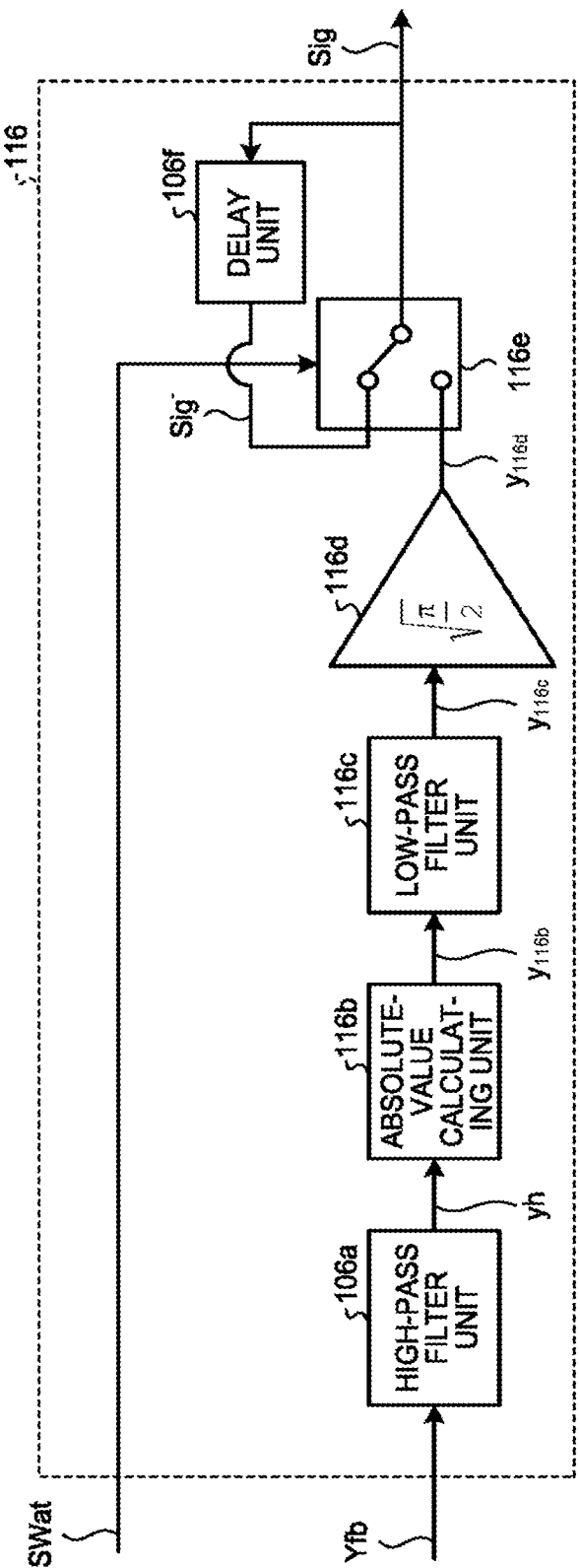
FIG. 5 is a configuration diagram of a standard-deviation estimating unit according to the second embodiment.

A second embodiment of the control apparatus according to the present invention is explained. FIG. 4 is a configuration diagram of a control apparatus 200 and the control target apparatus 10 according to the second embodiment. FIG. 5 is a configuration diagram of a standard-deviation estimating unit 116. The standard-deviation estimating unit 116 is obtained by adding a change to the standard-deviation estimating unit 106 of the control apparatus 100 explained above. Note that components having functions same as the functions in the first embodiment are denoted by reference numerals and signs same as the reference numerals and signs in the first embodiment and detailed explanation of the components is omitted.

The control apparatus 200 includes the control computing unit 101 that calculates the operation amount Uc, the adjustment-execution-command generating unit 102 that generates the adjustment-execution command value SWat, the binary output unit 103 that calculates the adjustment-time addition value Uadd, and the control-gain computing unit 104 that calculates a gain candidate value. The control apparatus 200 includes the control-gain adjusting unit 105 that changes a value of a gain used in the control computing unit 101, the standard-deviation estimating unit 106 that calculates the standard-deviation estimated value Sig, the hysteresis-width computing unit 107 that calculates the hysteresis-width computed value Hc, the subtracter 108 that performs subtraction, and the adder 109 that performs addition.

The tension command value Yr is input to the control apparatus 200 from the outside. The tension detection value Yfb is input to the control apparatus 200 from the control target apparatus 10. The control apparatus 200 outputs the tension-axis-speed addition value Vadd to the control target apparatus 10.

The standard-deviation estimating unit 116 includes the high-pass filter unit 106a that calculates the low-frequency-component removed signal yh, an absolute-value calculating unit 116b that calculates the absolute value of a value of the low-frequency-component removed signal yh and calculates an output signal $y_{116b}$, and a low-pass filter unit 116c that causes a low-pass filter to act and calculates an output signal $y_{116c}$. The standard-deviation estimating unit 116 includes a conversion gain device 116d that calculates an output signal $y_{116d}$ on the basis of the output signal $y_{116a}$, a selector unit 116e that outputs the standard-deviation estimated value Sig on the basis of the adjustment-execution command value SWat, and the delay unit 106f that retains the standard-deviation estimated value Sig.

The adjustment-execution command value SWat and the tension detection value Yfb are input to the standard-deviation estimating unit 116. In the period in which the adjustment-execution command value SWat is OFF, the standard-deviation estimating unit 116 calculates the standard-deviation estimated value Sig on the basis of the tension detection value Yfb and outputs the standard-deviation estimated value Sig.

The standard-deviation estimating unit 116 outputs the last standard-deviation estimated value Sig− in the automatic adjustment period in which the adjustment-execution command value SWat is ON. Therefore, the standard-deviation estimated value Sig output from the standard-deviation estimating unit 116 in the automatic adjustment period changes to the last standard-deviation estimated value Sig−.

The low-frequency-component removed signal yh is input to the absolute-value calculating unit 116b. The absolute-value calculating unit 116b calculates the output signal $y_{116b}$ obtained by calculating an absolute value with respect to the value of the low-frequency-component removed signal yh and outputs the output signal $y_{116b}$.

The output signal $y_{116b}$ is input to the low-pass filter unit 116c. The low-pass filter unit 116c causes the low-pass filter to act on the output signal $y_{116b}$, calculates the output signal $y_{116c}$ obtained by removing the high-frequency components of the output signal $y_{116b}$, and outputs the output signal $y_{116c}$. The output signal $y_{116c}$ is input to the conversion gain device 116d. The conversion gain device 116d multiplies the output signal $y_{116c}$ with $\sqrt{(\pi/2)}$ to calculate the output signal $y_{116d}$ and outputs the output signal $y_{116d}$. Note that $\sqrt{(\pi/2)}$ means that $(\pi/2)$ is a radical sign.

The last standard-deviation estimated value Sig− and the output signal $y_{116d}$ are input to the selector unit 116e. On the basis of the adjustment-execution command value SWat, the selector unit 116e selects the last standard-deviation estimated value Sig− when the adjustment-execution command value SWat is ON and selects the output signal $y_{116d}$ when the adjustment-execution command value SWat is OFF, changes the selected value to the standard-deviation estimated value Sig, and outputs the standard-deviation estimated value Sig.

That is, in the period in which the adjustment-execution command value SWat is OFF, the standard-deviation estimating unit 116 outputs the standard-deviation estimated value Sig, which is the estimated value of the standard deviation of the low-frequency-component removed signal yh obtained by removing the low-frequency components of the tension detection value Yfb.

The control apparatus 200 sets the hysteresis-width setting value Hs of the binary output unit 103 to an appropriate value and determines the adjustment-time addition value Uadd on the basis of the tension deviation value Ye and the hysteresis-width setting value Hs. Therefore, the influence of the noise included in the tension detection value Yfb is reduced. As a result, the control apparatus 200 can generate a limit cycle of a constant cycle or a cycle regarded as constant and accurately adjust a control gain.

The control apparatus 200 substitutes the calculated hysteresis-width computed value Hc in the hysteresis-width setting value Hs. At this point, the hysteresis-width computed value Hc is calculated on the basis of the standard-deviation estimated value Sig. The standard-deviation estimated value Sig is estimated as a satisfactory estimated value of a standard deviation of signals of noise included in the tension detection value Yfb by the standard-deviation estimating unit 106 explained below. That is, the control apparatus 200 estimates a value of the standard deviation of the signals of the noise included in the tension detection value Yfb on the basis of the standard-deviation estimated value Sig. Therefore, it is possible to estimate a distribution of the signals of noise that occurs in the automatic adjustment period. It is possible to calculate the hysteresis-width computed value Hc having magnitude of a degree larger than the amplitude of the signals of the noise at a high probability.

The control apparatus 200 and the control apparatus 100 are different only in the configuration of the standard-deviation estimating unit. Operation and effect in calculating the standard-deviation estimated value Sig with the standard-deviation estimating unit 116 are explained below.

As in the first embodiment, the time series signals x of a certain normal distribution are explained as an example. An average of the time series signals x is represented as $\mu_x$ and a standard deviation of the time series signals x is represented as $\sigma_x$. Signals obtained by calculating the absolute values of the time series signals x are represented as signals ax. An average of the signals ax is represented as $\mu_{ax}$. When the average $\mu_x$ of the time series signals x is 0, the following Expression (10) holds:

[Math. 11]

$$\mu_{ax} = \sqrt{\frac{2}{\pi}} \sigma_x \quad (10)$$

Therefore, a value obtained by multiplying the average $\mu_{ax}$ of the signals ax with $\sqrt{(\pi/2)}$ is a standard deviation of the time series signals x. Note that $\sqrt{(\pi/2)}$ means that $(\pi/2)$ is a radical sign.

Expression (1) and Expression (4) explained in the first embodiment hold in the case of the signals ax as well. Samples are extracted from the signals ax at the time interval dt. An i-th sample is represented as axs(i). A sample of the signals ax at the terminal end time is represented as axs(n). An i-th sample of a signal obtained by causing a first-order lag low-pass filter, which has $\tau$ larger than dt as a time constant, to act on the signals ax is represented as axlpf(i). At this point, the following Expression (11) and Expression (12) hold.

[Math. 12]

$$\mu_{ax} = \lim_{N \to \infty} \frac{1}{T} \sum_{k=0}^{N-1} axs(n-k) \times dt \quad (11)$$

[Math. 13]

$$axlpf(n) = \frac{1}{\tau} \sum_{k=0}^{N-1} axs(n-k) \times dt \quad (12)$$

where, T=N×dt.

When Expression (11) and Expression (12) are compared, it is seen that, because axlpf(n) and $\mu_{ax}$ coincide with each other or fit within a predetermined range when the number N of samples is large and the time constant $\tau$ of the low-pass filter is larger than the time interval dt of the samples, axlpf(n) is a good estimated value of $\mu_{ax}$.

The absolute-value calculating unit 116b, the low-pass filter unit 116c, and the conversion gain device 116d perform calculations same as the calculations in the example explained above. That is, the output signal $y_{116c}$ is a good estimated value of an average of the output signal $y_{116b}$. The output signal $y_{116d}$ is a good estimated value of the standard deviation of the low-frequency-component removed signal yh.

The control apparatus 200 can set hysteresis having appropriate magnitude and appropriately determines an adjustment-time addition value in the automatic adjustment period. Therefore, it is possible to suppress hunting due to the influence of the noise included in the tension detection value Yfb. As a result, the control apparatus 200 can generate a limit cycle of a constant cycle or a cycle regarded as constant and accurately calculate a value of a control gain.

Third Embodiment

Figure 6:
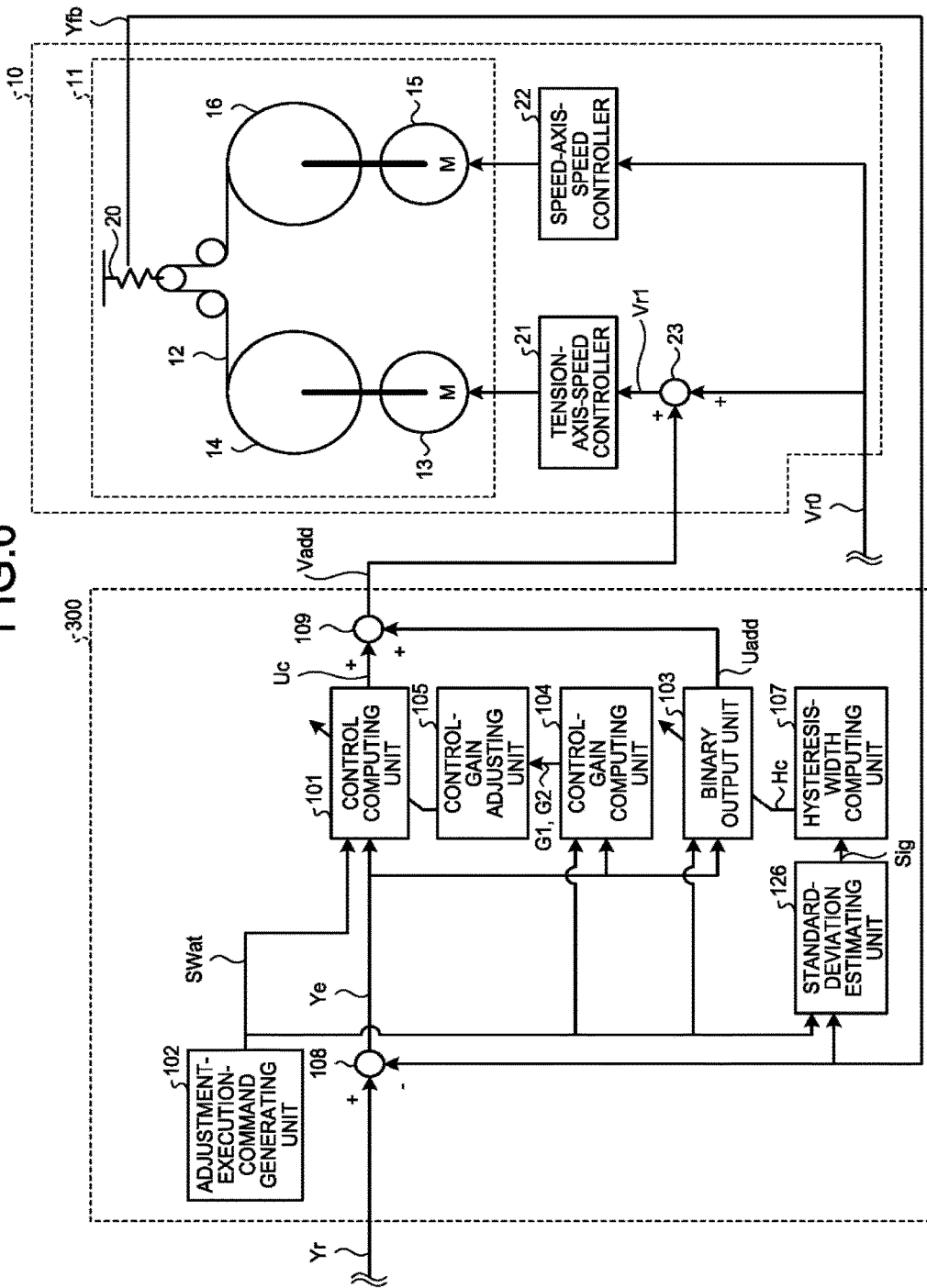
FIG. 6 is a configuration diagram of a control apparatus and a control target apparatus according to a third embodiment.
Figure 7:
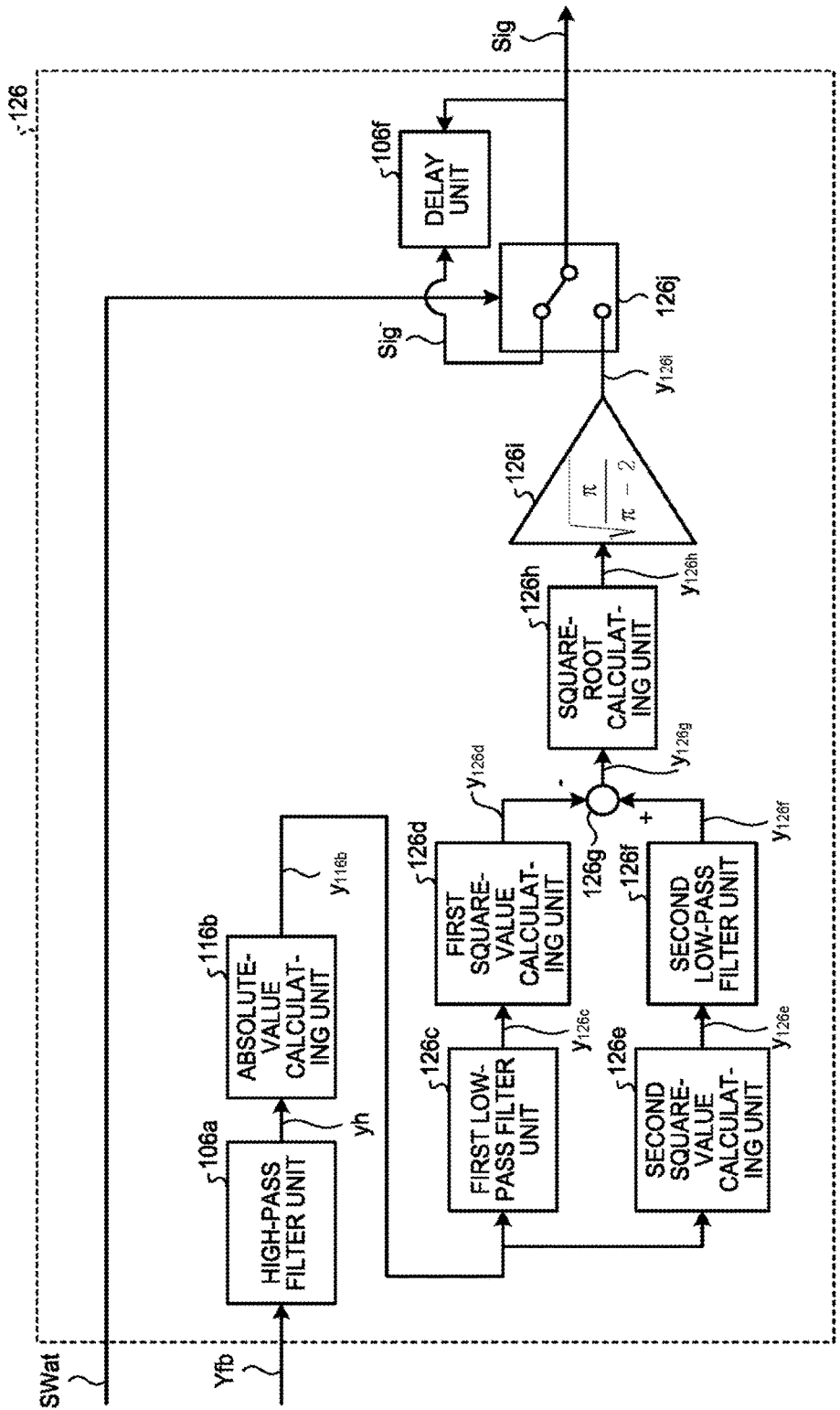
FIG. 7 is a configuration diagram of a standard-deviation estimating unit according to the third embodiment.

A third embodiment of the control apparatus according to the present invention is explained. FIG. 6 is a configuration diagram of a control apparatus 300 and the control target apparatus 10 according to the third embodiment. FIG. 7 is a configuration diagram of a standard-deviation estimating unit 126. The standard-deviation estimating unit 126 is obtained by adding a change to the standard-deviation estimating unit 116 of the control apparatus 200. Note that components having functions same as the functions in the first embodiment or the second embodiment are denoted by reference numerals and signs same as the reference numerals and signs in the first embodiment or the second embodiment and detailed explanation of the components is omitted.

The control apparatus 300 includes the control computing unit 101 that calculates the operation amount Uc, the adjustment-execution-command generating unit 102 that generates the adjustment-execution command value SWat, the binary output unit 103 that calculates the adjustment-time addition value Uadd, and the control-gain computing unit 104 that calculates a gain candidate value. The control apparatus 300 includes the control-gain adjusting unit 105 that changes a value of a gain used in the control computing unit 101, the standard-deviation estimating unit 126 that calculates the standard-deviation estimated value Sig, the hysteresis-width computing unit 107 that calculates the hysteresis-width computed value Hc, the subtracter 108 that performs subtraction, and the adder 109 that performs addition.

The tension command value Yr is input to the control apparatus 300 from the outside. The tension detection value Yfb is input to the control apparatus 300 from the control target apparatus 10. The control apparatus 300 outputs the tension-axis-speed addition value Vadd to the control target apparatus 10.

The standard-deviation estimating unit 126 includes the high-pass filter unit 106a that calculates the low-frequency-component removed signal yh, the absolute-value calculating unit 116b that calculates the absolute value of a value of the low-frequency-component removed signal yh and calculates the output signal $y_{116b}$, a first low-pass filter unit 126c that causes a low-pass filter to act and calculates an output signal $y_{126c}$, a first square-value calculating unit 126d that calculates an output signal $y_{126d}$ with square-value calculation, a second square-value calculating unit 126e that calculates an output signal $y_{126e}$ with square value calculation, and a second low-pass filter unit 126f that causes a low-pass filter to act and calculates an output signal $y_{126f}$. The standard-deviation estimating unit 126 includes a subtracter 126g that performs subtraction, a square-root calculating unit 126h that calculates an output value $y_{126h}$ with square root calculation, a conversion gain device 126i that calculates an output signal $y_{126i}$ on the basis of the output signal $y_{126h}$, a selector unit 126j that outputs the standard-deviation estimated value Sig on the basis of the adjustment-execution command value SWat, and the delay unit 106f that retains the standard-deviation estimated value Sig.

The adjustment-execution command value SWat and the tension detection value Yfb are input to the standard-deviation estimating unit 126. In the period in which the adjustment-execution command value SWat is OFF, the standard-deviation estimating unit 126 calculates the standard-deviation estimated value Sig on the basis of the tension detection value Yfb and outputs the standard-deviation estimated value Sig.

In the automatic adjustment period in which the adjustment-execution command value SWat is ON, the standard-deviation estimating unit 126 operates such that the last standard-deviation estimated value Sig− is output. Therefore, the standard-deviation estimated value Sig output from the standard-deviation estimating unit 126 in the automatic adjustment period changes to the last standard-deviation estimated value Sig−.

The output signal $y_{116b}$ is input to the first low-pass filter unit 126c. The first low-pass filter unit 126c causes the low-pass filter to act on the output signal $y_{116b}$, calculates the output signal $y_{126c}$ obtained by removing high-frequency components of the output signal $y_{116b}$, and outputs the output signal $y_{126c}$.

The output signal $y_{126c}$ is input to the first square-value calculating unit 126d. The first square-value calculating unit 126d calculates the output signal $y_{126d}$ obtained by raising the output signal $y_{126c}$ to the second power and outputs the output signal $y_{126d}$.

The output signal $y_{116b}$ is input to the second square-value calculating unit 126e. The second square-value calculating unit 126e calculates the output signal $y_{126e}$ obtained by raising the output signal $y_{116b}$ to the second power and outputs the output signal $y_{126e}$.

The output signal $y_{126e}$ is input to the second low-pass filter unit 126f. The second low-pass filter unit 126f causes the low-pass filter to act on the output signal $y_{126e}$, calculates the output signal $y_{126f}$ obtained by removing high-frequency components of the output signal $y_{126e}$, and outputs the output signal $y_{126f}$. The subtracter 126g calculates a difference between the output signal $y_{126d}$ and the output signal $y_{126f}$, calculates an output signal $y_{126g}$, and outputs the output signal $y_{126g}$.

The output signal $y_{126g}$ is input to the square-root calculating unit 126h. The square-root calculating unit 126h calculates the output signal $y_{126h}$ obtained by calculating a square root of the output signal $y_{126g}$ and outputs the output signal $y_{126h}$. The output signal $y_{126h}$ is input to the conversion gain device 126i. The conversion gain device 126i multiplies the output signal $y_{126h}$ with $\sqrt{(\pi/(\pi-2))}$ to calculate the output signal $y_{126i}$ and outputs the output signal $y_{126i}$. Note that $\sqrt{(\pi/(\pi-2))}$ means that $(\pi/(\pi-2))$ is a radical sign.

The last standard-deviation estimated value Sig− and the output signal $y_{126i}$ are input to the selector unit 126j. On the basis of the adjustment-execution command value SWat, the selector unit 126j selects the last standard-deviation estimated value Sig− when the adjustment-execution command value SWat is ON and selects the output signal $y_{126i}$ when the adjustment-execution command value SWat is OFF, changes the selected value to the standard-deviation estimated value Sig, and outputs the standard-deviation estimated value Sig.

That is, in the period in which the adjustment-execution command value SWat is OFF, the standard-deviation estimating unit 126 outputs the standard-deviation estimated value Sig, which is the estimated value of the standard deviation of the low-frequency-component removed signal yh obtained by removing the low-frequency components of the tension detection value Yfb.

The control apparatus 300 sets the hysteresis-width setting value Hs of the binary output unit 103 to an appropriate value and determines the adjustment-time addition value Uadd on the basis of the tension deviation value Ye and the hysteresis-width setting value Hs. Therefore, the influence of the noise included in the tension detection value Yfb is reduced. As a result, the control apparatus 300 can generate a limit cycle of constant cycle or a cycle regarded as constant and accurately adjust a control gain.

The control apparatus 300 substitutes the calculated hysteresis-width computed value Hc in the hysteresis-width setting value Hs. At this point, the hysteresis-width computed value Hc is calculated on the basis of the standard-deviation estimated value Sig. The standard-deviation estimated value Sig is estimated as a satisfactory estimated value of a standard deviation of signals of noise included in the tension detection value Yfb by the standard-deviation estimating unit 126 explained below. That is, the control apparatus 300 estimates a value of the standard deviation of the signals of the noise included in the tension detection value Yfb on the basis of the standard-deviation estimated value Sig. Therefore, it is possible to estimate a distribution of the signals of the noise that occurs in the automatic adjustment period. It is possible to calculate the hysteresis-width computed value Hc having magnitude of a degree larger than the amplitude of the signals of the noise at a high probability.

The control apparatus 300 and the control apparatus 100 are different only in the configuration of the standard-deviation estimating unit. Operation and effect in calculating the standard-deviation estimated value Sig with the standard-deviation estimating unit 126 are explained below.

As in the first embodiment and the second embodiment, the time series signals x of a certain normal distribution are explained as an example. An average of the time series signals x is represented as $\mu_x$ and a standard deviation of the time series signals x is represented as $\sigma_x$. Signals obtained by calculating the absolute values of the time series signals x are represented as signals ax. An average of the signals ax is represented as $\mu_{ax}$. A standard deviation is of the signals ax is represented as $\sigma_{ax}$. When the average $\mu_x$ of the time series signals x is 0, the following Expression (13) holds:

[Math. 14]

$$\sigma_{ax} = \sqrt{\frac{\pi - 2}{\pi}} \sigma_x \qquad (13)$$

Therefore, a value obtained by multiplying the standard deviation $\sigma_{ax}$ of the signals ax with $\sqrt{(\pi/(\pi-2))}$ is a standard deviation of the time series signals x. Note that $\sqrt{(\pi/(\pi-2))}$ means that $(\pi/(\pi-2))$ is a radical sign.

Samples are extracted from the signals ax at the time interval dt. An i-th sample is represented as axs(i). A sample of the signals ax at the terminal end time is represented as axs(n). An i-th sample of a signal obtained by causing a first-order lag low-pass filter, which has τ larger than dt as a time constant, to act on the signals ax is represented as axlpf(i). The standard deviation $\sigma_{ax}$ of the signals ax is calculated by the following Expression (14).

[Math. 15]

$$\sigma_{ax} = \sqrt{\lim_{N\to\infty} \frac{1}{T} \sum_{K=0}^{N=1} axs(n-k)^2 \times dt - \mu_{ax}^2} \quad (14)$$

where, T=N×dt.

When a result obtained by causing the first-order lag low-pass filter, which has τ as the time constant, to act on a value obtained by raising the sample axs(n) to the second power is represented as ax2lpf(n), ax2lpf(n) is calculated by the following Expression (15).

[Math. 16]

$$ax2lpf(n) = \lim_{N\to\infty} \frac{1}{\tau} \sum_{k=0}^{N-1} axs(n-k)^2 \times dt \quad (15)$$

What is represented by B in Expression (16-1) defined by Expression (16-2) using ax1lpf(n) and ax2lpf(n) calculated by Expression (12) and Expression (15).

[Math. 17]

$$B = \tilde{\sigma}_{ax}(n) \quad (16\text{-}1)$$

[Math. 18]

$$\tilde{\sigma}_{ax}(n) = \sqrt{ax2lpf(n) - ax1lpf(n)^2} \quad (16\text{-}2)$$

When Expression (14) and Expression (16-2) are compared, it is seen that, because B and $\sigma_{ax}$ coincide with each other or fit within a predetermined range when the number N of samples is large and the time constant τ of the low-pass filter is larger than the time interval dt of the samples, B is a good estimated value of $\sigma_{ax}$.

The absolute-value calculating unit 116b, the first low-pass filter unit 126c, the first square-value calculating unit 126d, the second square-value calculating unit 126e, the second low-pass filter unit 126f, the subtracter 126g, the square-root calculating unit 126h, and the conversion gain device 126i perform calculations same as the calculations in the example explained above. That is, the output signal $y_{126h}$ is a good estimated value of the standard deviation of the output signal $y_{116b}$. The output signal $y_{126i}$ is a good estimated value of the standard deviation of the low-frequency-component removed signal yh.

The control apparatus 300 can set hysteresis having appropriate magnitude and appropriately determines an adjustment-time addition value in the automatic adjustment period. Therefore, it is possible to suppress hunting due to the influence of the noise included in the tension detection value Yfb. As a result, the control apparatus 300 can generate a limit cycle of a constant cycle or a cycle regarded as constant and accurately calculate a value of a control gain.

Fourth Embodiment

Figure 8:
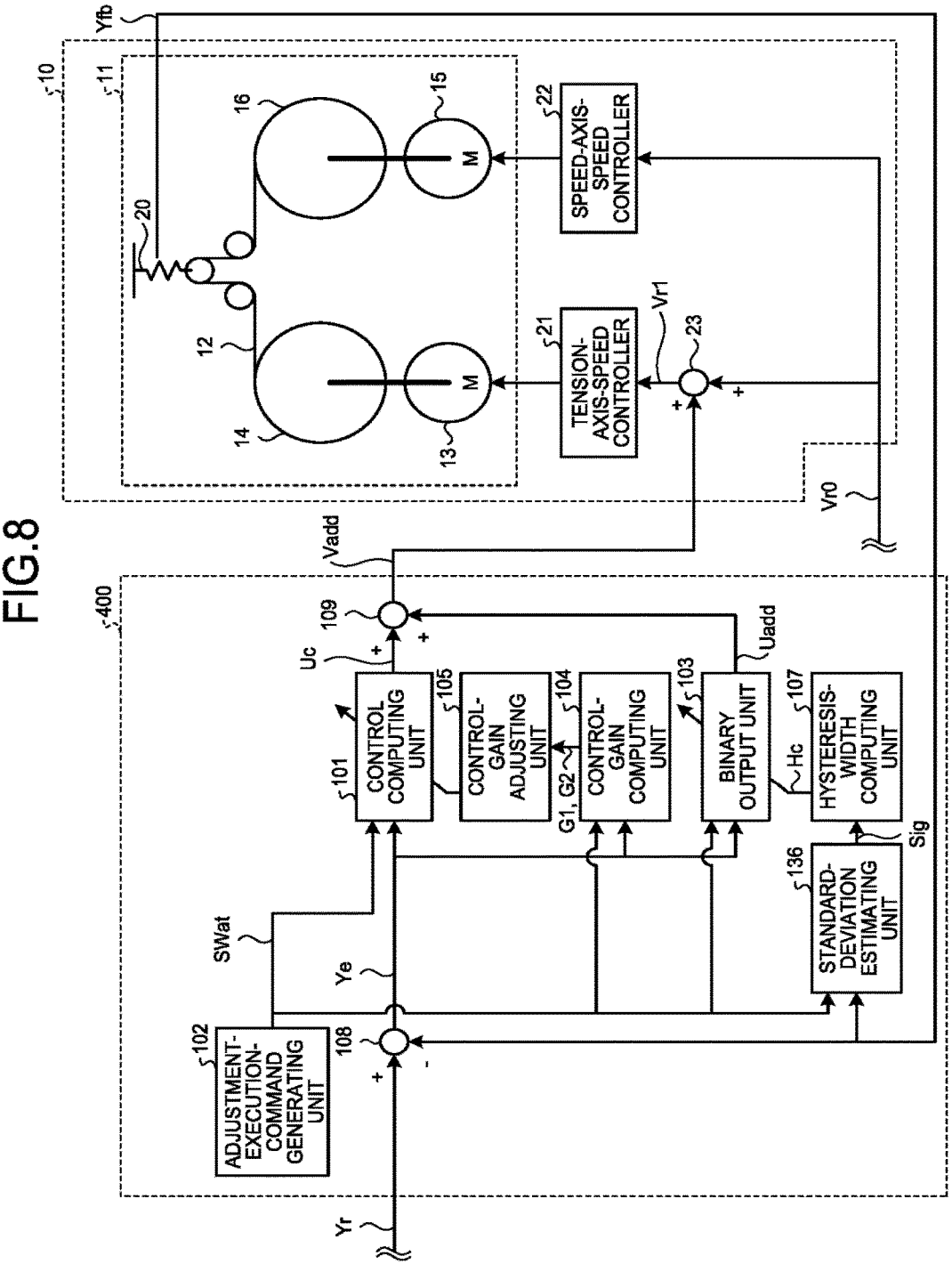
FIG. 8 is a configuration diagram of a control apparatus and a control target apparatus according to a fourth embodiment.
Figure 9:
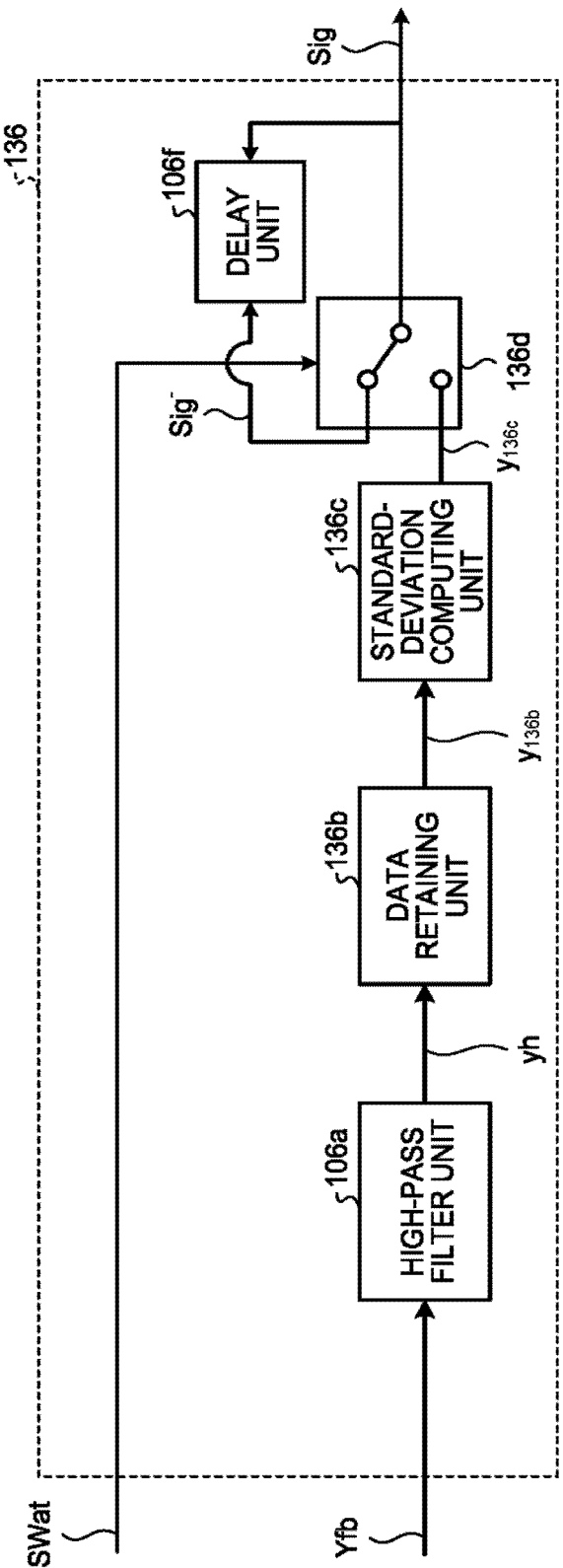
FIG. 9 is a configuration diagram of a standard-deviation estimating unit according to the fourth embodiment.

A fourth embodiment of the control apparatus according to the present invention is explained. FIG. 8 is a configuration diagram of a control apparatus 400 and the control target apparatus 10 according to the fourth embodiment. FIG. 9 is a configuration diagram of a standard-deviation estimating unit 136. The standard-deviation estimating unit 136 is obtained by adding a change to the standard-deviation estimating unit 106 of the control apparatus 100. Note that components having functions same as the functions in the first embodiment are denoted by reference numerals and signs same as the reference numerals and signs in the first embodiment or the second embodiment and detailed explanation of the components is omitted.

The control apparatus 400 includes the control computing unit 101 that calculates the operation amount Uc, the adjustment-execution-command generating unit 102 that generates the adjustment-execution command value SWat, the binary output unit 103 that calculates the adjustment-time addition value Uadd, and the control-gain computing unit 104 that calculates a gain candidate value. The control apparatus 400 includes the control-gain adjusting unit 105 that changes a value of a gain used in the control computing unit 101, the standard-deviation estimating unit 136 that calculates the standard-deviation estimated value Sig, the hysteresis-width computing unit 107 that calculates the hysteresis-width computed value Hc, the subtracter 108 that performs subtraction, and the adder 109 that performs addition.

The tension command value Yr is input to the control apparatus 400 from the outside. The tension detection value Yfb is input to the control apparatus 400 from the control target apparatus 10. The control apparatus 400 outputs the tension-axis-speed addition value Vadd to the control target apparatus 10.

The standard-deviation estimating unit 136 includes the high-pass filter unit 106a that calculates the low-frequency-component removed signal yh, a data retaining unit 136b that retains the low-frequency-component removed signal yh, a standard-deviation computing unit 136c that calculates a standard deviation, a selector unit 136d that outputs the standard-deviation estimated value Sig on the basis of the adjustment-execution command value SWat, and the delay unit 106f that retains the standard-deviation estimated value Sig.

The adjustment-execution command value SWat and the tension detection value Yfb are input to the standard-deviation estimating unit 136. In the period in which the adjustment-execution command value SWat is OFF, the standard-deviation estimating unit 136 calculates the standard-deviation estimated value Sig on the basis of the tension detection value Yfb and outputs the standard-deviation estimated value Sig.

In the automatic adjustment period in which the adjustment-execution command value SWat is ON, the standard-deviation estimating unit 136 operates such that the last standard-deviation estimated value Sig− is output. Therefore, the standard-deviation estimated value Sig output from the standard-deviation estimating unit 136 in the automatic adjustment period changes to the last standard-deviation estimated value Sig−.

The low-frequency-component removed signal yh is input to the data retaining unit 136b. The data retaining unit 136b retains a value of the low-frequency-component removed signal yh as data associated with time, changes latest m data among the retained data to an output signal $y_{136b}$, and outputs the output signal $y_{136b}$. Note that m is an integer equal to or larger than 1.

The output signal $y_{136b}$ is input to the standard-deviation computing unit 136c. The standard-deviation computing unit 136c calculates a standard deviation of the output signal $y_{136b}$ and outputs a calculated output signal $y_{136c}$. The output signal $y_{136b}$ is m low-frequency-component removed signals yh associated with time and is the low-frequency-component removed signal yh in a predetermined period. Therefore, in the following explanation, the standard deviation of the output signal $y_{136b}$ is referred to as a standard deviation in the predetermined period.

The last standard-deviation estimated value Sig– and the output signal $y_{136c}$ are input to the selector unit 136d. On the basis of the adjustment-execution command value SWat, the selector unit 136d selects the last standard-deviation estimated value Sig– when the adjustment-execution command value SWat is ON and selects the output signal $y_{136c}$ when the adjustment-execution command value SWat is OFF, changes the selected value to the standard-deviation estimated value Sig, and outputs the standard-deviation estimated value Sig.

That is, in the period in which the adjustment-execution command value SWat is OFF, the standard-deviation estimating unit 136 outputs the standard-deviation estimated value Sig, which is the estimated value of the standard deviation of the low-frequency-component removed signal yh obtained by removing the low-frequency components of the tension detection value Yfb.

The control apparatus 400 sets the hysteresis-width setting value Hs of the binary output unit 103 to an appropriate value and determines the adjustment-time addition value Uadd on the basis of the tension deviation value Ye and the hysteresis-width setting value Hs. Therefore, the influence of the noise included in the tension detection value Yfb is reduced. As a result, the control apparatus 400 can generate a limit cycle of a constant cycle or a cycle regarded as constant and accurately adjust a control gain.

The control apparatus 400 substitutes the calculated hysteresis-width computed value Hc in the hysteresis-width setting value Hs. At this point, the hysteresis-width computed value Hc is calculated on the basis of the standard-deviation estimated value Sig. The standard-deviation estimated value Sig is estimated as a satisfactory estimated value of a standard deviation of signals of noise included in the tension detection value Yfb by the standard-deviation estimating unit 136 explained below. That is, the control apparatus 400 estimates a value of the standard deviation of the signals of the noise included in the tension detection value Yfb on the basis of the standard-deviation estimated value Sig. Therefore, it is possible to estimate a distribution of the signals of the noise that occurs in the automatic adjustment period. It is possible to calculate the hysteresis-width computed value Hc having magnitude of a degree larger than the amplitude of the signals of the noise at a high probability.

The control apparatus 400 and the control apparatus 100 are different only in the configuration of the standard-deviation estimating unit. Operation and effect in calculating the standard-deviation estimated value Sig with the standard-deviation estimating unit 136 are explained below.

As in the first, second, and third embodiments, the time series signals x of a certain normal distribution are explained as an example. A standard deviation of the time series signals x is represented as $\sigma_x$. According to Expression (2), the standard deviation $\sigma_x$ is calculated when the number of samples xs is infinitely increased. Here, $\mu_{xM}$ and $\sigma_{xM}$ are defined by Expression (17) and Expression (18) using a certain number M. M is an integer equal to or larger than 1.

[Math. 19]

$$\mu_{xM} = \frac{1}{T}\sum_{k=0}^{M-1} xs(n-k) \times dt \qquad (17)$$

[Math. 20]

$$\sigma_{xM} = \sqrt{\frac{1}{T}\sum_{k=0}^{M-1} xs(n-k)^2 \times dt - \mu_{xM}^2} \qquad (18)$$

When Expression (2) and Expression (18) are compared, if M is a large number, $\sigma_{xM}$ calculated by M samples xs and the standard deviation $\sigma_x$ coincide with each other or fit within a predetermined range. Therefore, $\sigma_{xM}$ is considered to be a good estimated value of the standard deviation $\sigma_x$. Because $\sigma_{xM}$ is a standard deviation of the time series signals x in a predetermined period, $\sigma_{xM}$ is the specified period standard deviation explained above.

When the number m of data of the low-frequency removed signal yh retained in the data retaining unit 136b is set to a large value, the standard-deviation computing unit 136c performs calculation same as the calculation in the example explained above. That is, the output signal $y_{136c}$ is considered to be a good estimated value of the standard deviation of the low-frequency-component removed signal yh.

Therefore, the control apparatus 400 can set hysteresis having appropriate magnitude and appropriately determines an adjustment-time addition value in the automatic adjustment period. Therefore, it is possible to suppress hunting due to the influence of the noise included in the tension detection value Yfb. As a result, the control apparatus 400 can generate a limit cycle of a constant cycle or a cycle regarded as constant and accurately calculate a value of a control gain.

Fifth Embodiment

Figure 10:
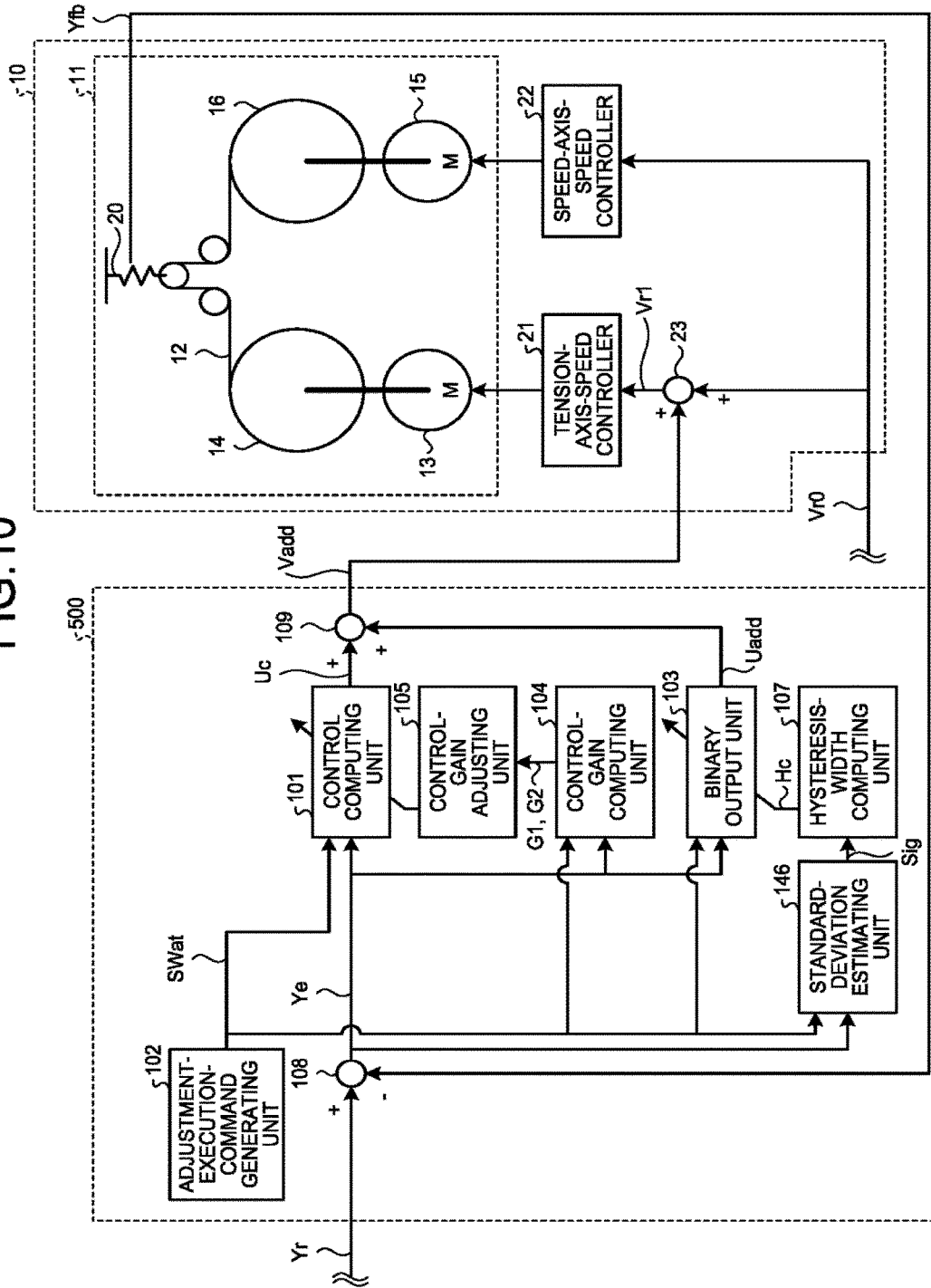
FIG. 10 is a configuration diagram of a control apparatus and a control target apparatus according to a fifth embodiment.
Figure 11:
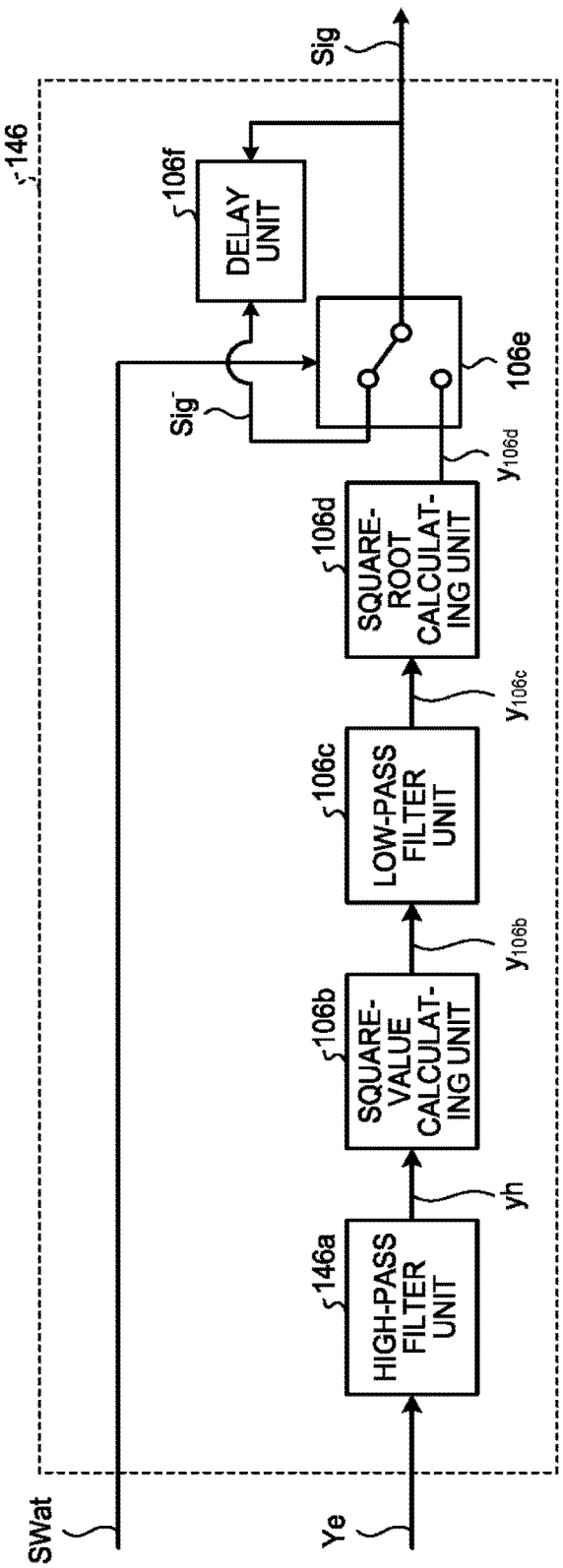
FIG. 11 is a configuration diagram of a standard-deviation estimating unit according to the fifth embodiment.

A fifth embodiment of the control apparatus according to the present invention is explained. FIG. 10 is a configuration diagram of a control apparatus 500 and the control target apparatus 10 according to the fifth embodiment. FIG. 11 is a configuration diagram of a standard-deviation estimating unit 146. The standard-deviation estimating unit 146 is obtained by adding a change to the standard-deviation estimating unit 106 of the control apparatus 100. Note that components having functions same as the functions in the first embodiment are denoted by reference numerals and signs same as the reference numerals and signs in the first embodiment and detailed explanation of the components is omitted.

The control apparatus 500 includes the control computing unit 101 that calculates the operation amount Uc, the adjustment-execution-command generating unit 102 that generates the adjustment-execution command value SWat, the binary output unit 103 that calculates the adjustment-time addition value Uadd, and the control-gain computing unit 104 that calculates a gain candidate value. The control apparatus 500 includes the control-gain adjusting unit 105 that changes a value of a gain used in the control computing unit 101, the standard-deviation estimating unit 146 that calculates the standard-deviation estimated value Sig, the hysteresis-width computing unit 107 that calculates the hysteresis-width computed value Hc, the subtracter 108 that performs subtraction, and the adder 109 that performs addition. The tension command value Yr is input to the control apparatus 500 from the outside. The tension detection value Yfb is input to the control apparatus 500 from the control target apparatus 10. The control apparatus 500 outputs the tension-axis-speed addition value Vadd to the control target apparatus 10.

The standard-deviation estimating unit 146 includes a high-pass filter unit 146a that calculates the low-frequency-component removed signal yh, the square-value calculating unit 106b that calculates the output signal $y_{106b}$ with square value calculation, and the low-pass filter unit 106c that causes the low-pass filter to act and calculates the output signal $y_{106c}$. The standard-deviation estimating unit 146 includes the square-root calculating unit 106d that calculates the output signal $y_{106d}$ with square root calculation, the selector unit 106e that outputs the standard-deviation estimated value Sig on the basis of the adjustment-execution command value SWat, and the delay unit 106f that retains the standard-deviation estimated value Sig.

The adjustment-execution command value SWat and the tension deviation value Ye are input to the standard-deviation estimating unit 146. In the period in which the adjustment-execution command value SWat is OFF, the standard-deviation estimating unit 146 calculates the standard-deviation estimated value Sig on the basis of the tension deviation value Ye and outputs the standard-deviation estimated value Sig.

In the automatic adjustment period in which the adjustment-execution command value SWat is ON, the standard-deviation estimating unit 146 operates such that the last standard-deviation estimated value Sig− is output. Therefore, the standard-deviation estimated value Sig output from the standard-deviation estimating unit 146 in the automatic adjustment period changes to the last standard-deviation estimated value Sig−.

The tension deviation value Ye is input to the high-pass filter unit 146a. The high-pass filter unit 146a causes the high-pass filter to act on the tension detection value Ye, calculates the low-frequency-component removed signal yh obtained by removing the low-frequency components of the tension deviation value Ye, and outputs the low-frequency-component removed signal yh.

That is, in the period in which the adjustment-execution command value SWat is OFF, the standard-deviation estimating unit 146 outputs the standard-deviation estimated value Sig, which is the estimated value of the standard deviation of the low-frequency-component removed signal yh obtained by removing the low-frequency components of the tension deviation value Ye.

The control apparatus 500 sets the hysteresis-width setting value Hs of the binary output unit 103 to an appropriate value and determines the adjustment-time addition value Uadd on the basis of the tension deviation value Ye and the hysteresis-width setting value Hs. Therefore, the influence of the noise included in the tension detection value Yfb is reduced. As a result, the control apparatus 500 can generate a limit cycle of a constant cycle or a cycle regarded as constant and accurately adjust a control gain.

The control apparatus 500 substitutes the calculated hysteresis-width computed value Hc in the hysteresis-width setting value Hs. At this point, the hysteresis-width computed value Hc is calculated on the basis of the standard-deviation estimated value Sig. The standard-deviation estimated value Sig is estimated as a satisfactory estimated value of a standard deviation of signals of noise included in the tension detection value Yfb by the standard-deviation estimating unit 146 explained below. That is, the control apparatus 500 estimates a value of the standard deviation of the signals of the noise included in the tension detection value Yfb on the basis of the standard-deviation estimated value Sig. Therefore, it is possible to estimate a distribution of the signals of the noise that occurs in the automatic adjustment period. It is possible to calculate the hysteresis-width computed value Hc having magnitude of a degree larger than the amplitude of the signals of the noise at a high probability.

The control apparatus 500 and the control apparatus 100 are different only in the configuration of the standard-deviation estimating unit. Operation and effect in calculating the standard-deviation estimated value Sig with the standard-deviation estimating unit 146 are explained below.

The tension deviation value Ye input to the standard-deviation estimating unit 146 is obtained by subtracting the tension command value Yr, which is a fixed value, from the tension detection value Yfb. Only low-frequency components are different from low-frequency components of the tension detection value Yfb. Therefore, a signal obtained by removing the low-frequency components of the tension deviation value Ye coincides with or fits within a predetermined range with respect to a signal obtained by removing the low-frequency components from the tension detection value Yfb.

Therefore, the standard-deviation estimating unit 146 is the same as the standard-deviation estimating unit 106 of the control apparatus 100 except the high-pass filter unit 146a that calculates the low-frequency-component removed signal yh. Therefore, an effect same as the effect of the standard-deviation estimating unit 106 can be obtained.

Therefore, the control apparatus 500 can set hysteresis having appropriate magnitude and appropriately determines an adjustment-time addition value in the automatic adjustment period. Therefore, it is possible to suppress hunting due to the influence of the noise included in the tension detection value Yfb. As a result, the control apparatus 500 can generate a limit cycle of a constant cycle or a cycle regarded as constant and accurately calculate a value of a control gain.

Sixth Embodiment

Figure 12:
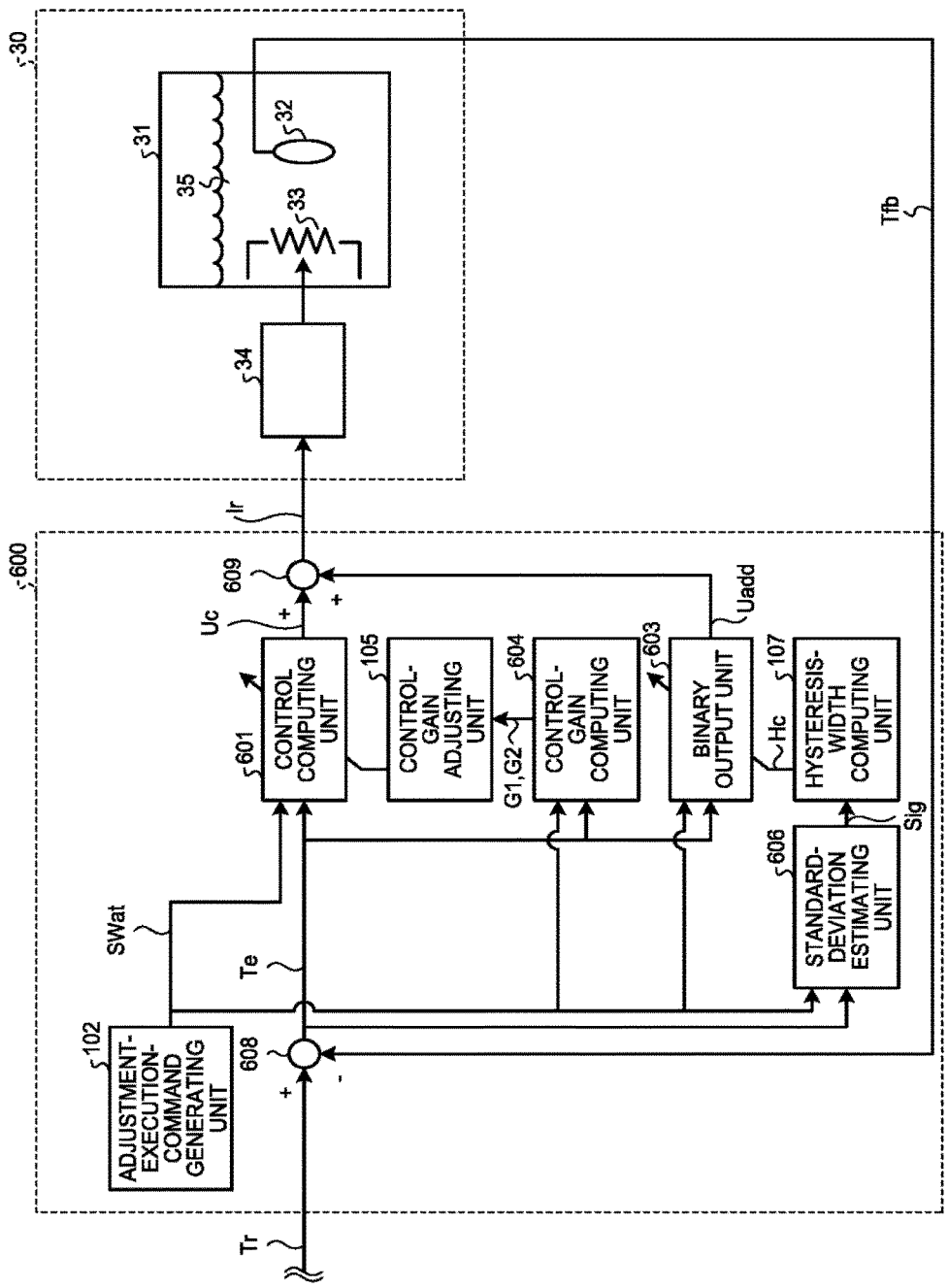
FIG. 12 is a configuration diagram of a control apparatus and a control target apparatus according to a sixth embodiment.

FIG. 12 is a configuration diagram of a control apparatus 600 and a control target apparatus 30 according to a sixth embodiment. Note that, among components of the control apparatus 600, components having functions same as the functions of the control apparatus 100 according to the first embodiment are denoted by reference numerals and signs same as the reference numerals and signs in the first embodiment and detailed explanation of the components is omitted.

As shown in FIG. 12, the control target apparatus 30 is a liquid heating apparatus including a water tank 31 that stores liquid 35, a temperature detector 32 that detects the temperature of the liquid 35, a heater 33 that heats the liquid 35, and a current supplier 34 that supplies an electric current. The liquid heating apparatus adjusts the temperature of the liquid 35.

A current command value Ir is input to the control target apparatus 30 from the control apparatus 600. The control target apparatus 30 outputs a temperature detection value Tfb.

The temperature detector 32 detects the temperature of the liquid 35 and outputs the temperature detection value Tfb, which is a detected value. The temperature detection value Tfb is a control amount and is a value controlled to approach a command value as explained below.

An electric current is supplied to the heater 33 from the current supplier 34. The heater 33 generates heat on the basis of the magnitude of the supplied electric current. The heat generated by the heater 33 is transmitted to the liquid 35 and heats the liquid 35.

The current supplier 34 supplies, on the basis of the current command value Ir, an amount of an electric current coinciding with the current command value Ir to the heater 33.

The liquid 35 is a liquid such as water, oil, or a drug solution. Because the heat is transmitted from the heater 33, the temperature of the liquid 35 rises. That is, when a value of the current command value Ir is changed, the temperature of the liquid 35 changes.

The control target apparatus 30 measures the temperature of the liquid 35 with the temperature detector 32 and outputs the temperature detection value Tfb. That is, the control target apparatus 30 is configured to perform feedback control by being combined with the control apparatus 600 that calculates the current command value Ir using the value of the temperature detection value Tfb.

The control apparatus 600 includes a control computing unit 601 that calculates the operation amount Uc, the adjustment-execution-command generating unit 102 that generates the adjustment-execution-command value SWat, which is a command value indicating possibility of execution of adjustment, a binary output unit 603 that calculates the adjustment-time addition value Uadd, which is a value added to the operation amount Uc during the adjustment, and a control-gain computing unit 604 that calculates a gain candidate value. The control apparatus 600 includes the control-gain adjusting unit 105 that changes a value of a gain used in the control computing unit 601, a standard-deviation estimating unit 606 that calculates the standard-deviation estimated value Sig, the hysteresis-width computing unit 107 that calculates the hysteresis-width computed value Hc, a subtracter 608 that performs subtraction, and an adder 609 that performs addition. A temperature command value Tr is input to the control apparatus 600 from the outside. A temperature detection value Tfb is input to the control apparatus 600 from the control target apparatus 30. The control apparatus 600 outputs the current command value Ir to the control target apparatus 30.

The control computing unit 601, the binary output unit 603, and the control-gain computing unit 604 have functions same as the functions of the control computing unit 101, the binary output unit 103, and the control-gain computing unit 104 in the first embodiment except that one of input signals is a temperature deviation value Te. Therefore, detailed explanation of operation is omitted. The standard-deviation estimating unit 606 has a function same as the function of the standard-deviation estimating unit 106 in the first embodiment except that one of input signals is the temperature deviation value Te and the other of the input signals is the temperature detection value Tfb. Therefore, detailed explanation of operation is omitted.

The temperature command value Tr and the temperature detection value Tfb are input to the subtracter 608. The subtracter 608 calculates the temperature deviation value Te from a difference between the temperature command value and the temperature detection value Tfb and outputs the temperature deviation value Te.

The operation amount Uc and the adjustment-time addition value Uadd are input to the adder 609. The adder 609 adds up the operation amount Uc and the adjustment-time addition value Uadd to calculate the current command value Ir and outputs the current command value Ir.

When the adjustment execution command SWat is OFF, the control target apparatus 30 is feedback-controlled such that the temperature detection value Tfb approaches the temperature command value Tr according to the operation amount Uc calculated by the control computing unit 601.

When the adjustment execution command SWat is ON and the hysteresis-width setting value Hs is appropriately set, the current command value Ir and the temperature deviation value Te generate limit cycle vibration of a constant cycle or a cycle regarded as constant.

The control apparatus 600 according to the sixth embodiment has a configuration same as the configuration of the control apparatus 100 according to the first embodiment. Therefore, the control apparatus 600 achieves an effect same as the effect achieved by the control apparatus 100.

Therefore, the control apparatus 600 can set hysteresis having appropriate magnitude and appropriately determines the adjustment-time addition value Uadd. Therefore, it is possible to suppress hunting due to the influence of noise included in the temperature detection value Tfb. As a result, the control apparatus 600 can generate a limit cycle of a constant cycle or a cycle regarded as constant and accurately calculate a value of a control gain.

REFERENCE SIGNS LIST 10, 30 control target apparatus
11 inter-roll conveying mechanism
12 conveyed material
13 tension axis motor
14 tension axis roll
15 speed axis motor
16 speed axis roll
20 tension detector
21 tension-axis-speed controller
22 speed-axis-speed controller
23, 109, 609 adder
31 water tank
32 temperature detector
33 heater
34 current supplier
35 liquid
100, 200, 300, 400, 500, 600 control apparatus
101, 601 control computing unit
102 adjustment-execution-command generating unit
103, 603 binary output unit
104, 604 control-gain computing unit
105 control-gain adjusting unit
106, 116, 126, 136, 146, 606 standard-deviation estimating unit
106a, 146a high-pass filter unit
106b square-value calculating unit
106c, 116c low-pass filter unit
106d, 126h square-root calculating unit
106e, 116e, 126j, 136d selector unit
106f delay unit
107 hysteresis-width computing unit
108, 126g, 608 subtracter
116b absolute-value calculating unit
116d, 126i conversion gain device
126d first square-value calculating unit
126e second square-value calculating unit
126c first low-pass filter unit
126f second low-pass filter unit
136b data retaining unit
136c standard-deviation computing unit

The invention claimed is:
1. A control apparatus comprising:
a subtracter to calculate a control deviation on the basis of a command value input from an outside and a control amount input from a control target apparatus;

a control computer to generate an operation amount on the basis of the control deviation and a control gain and outputs the operation amount;

an adjustment-execution-command generator to generate an adjustment-execution command value indicating ON or OFF and outputs the adjustment-execution command value;

a binary calculator to generate, in a period in which the adjustment-execution command value output from the adjustment-execution-command generator is ON, an adjustment-time addition value on the basis of the control deviation and a hysteresis-width setting value and outputs the adjustment-time addition value;

a standard-deviation estimator to calculate, in a period in which the adjustment-execution command value output from the adjustment-execution-command generator is OFF, a low-frequency-component removed signal obtained by removing low-frequency components of the control amount or the control deviation and calculates a standard-deviation estimated value, which is an estimated value of a standard deviation of the low-frequency component removed signal; and a hysteresis-width computer to calculate a hysteresis-width computed value on the basis of the standard-deviation estimated value and changes the hysteresis-width setting value of the binary output unit to the hysteresis-width computed value.

2. The control apparatus according to claim 1, wherein the standard-deviation estimator extracts and retains a value of the low-frequency-component removed signal in a predetermined period, calculates a standard deviation of the extracted and retained value, and sets the calculated standard deviation of the predetermined period as the standard-deviation estimated value.

3. The control apparatus according to claim 1, wherein the standard-deviation estimator calculates a signal obtained by raising the low-frequency-component removed signal to a second power, causes a low-pass filter to act on the calculated signal and calculates a signal obtained by removing high-frequency components, and calculates a square root of the calculated signal to thereby calculate the standard-deviation estimated value.

4. The control apparatus according to claim 1, wherein the hysteresis-width computer calculates the hysteresis-width computed value by multiplying the standard-deviation estimated value with a predetermined coefficient.

5. The control apparatus according to claim 1, wherein the standard-deviation estimator causes a high-pass filter to act on the control amount or the control deviation to thereby calculate the low-frequency-component removed signal.

6. The control apparatus according to claim 1, further comprising:

a control-gain computer to calculate, in the period in which the adjustment-execution command value output from the adjustment-execution-command generator is ON, a control-gain candidate value, which is a candidate value of the control gain, on the basis of the control deviation; and a control-gain adjustor to change the control gain used for the calculation of the operation amount by the control computer to the control-gain candidate value calculated by the control-gain computer.

7. A control method comprising:

a subtracting step of performing subtraction of a command value input from an outside and a control amount input from a control target apparatus to thereby calculate a control deviation;

a control computing step of generating an operation amount on the basis of the control deviation and a control gain and outputting the operation amount;

an adjustment-execution-command generating step of generating an adjustment-execution command value indicating ON or OFF and outputting the adjustment execution command value;

a binary output step of generating, in a period in which the adjustment-execution command value output from the adjustment-execution-command generating step is ON, an adjustment-time addition value on the basis of the control deviation and a hysteresis-width setting value and outputting the adjustment-time addition value;

a standard-deviation estimating step of calculating, in a period in which the adjustment-execution command value output from the adjustment-execution-command generating step is OFF, a low-frequency-component removed signal obtained by removing low-frequency components of the control amount or the control deviation and calculating a standard-deviation estimated value, which is an estimated value of a standard deviation of the low-frequency component removed signal; and a hysteresis-width computing step of calculating a hysteresis-width computed value on the basis of the standard-deviation estimated value and changing the hysteresis-width setting value of the binary output step to the hysteresis-width computed value.

* * * * *